(12) United States Patent
Sonoda et al.

(10) Patent No.: US 6,298,150 B1
(45) Date of Patent: *Oct. 2, 2001

(54) IMAGE PROCESSING DEVICE FOR DETECTING ONE-COLOR MARKS OF A NUMBER OF COLORS AND IMAGE PROCESSING METHOD THEREOF

(75) Inventors: Shinya Sonoda; Masahiro Akagi; Kouichi Ohmae; Masahito Yanagida; Masahiro Senga, all of Tsuchido-cho (JP)

(73) Assignee: Omron Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/675,490

(22) Filed: Jul. 1, 1996

(30) Foreign Application Priority Data

Jun. 30, 1995 (JP) .................................................. 7-165532

(51) Int. Cl.$^7$ ...................................................... G06K 9/00
(52) U.S. Cl. .......................... 382/162; 382/165; 382/218
(58) Field of Search .................................... 382/162, 164, 382/165, 135, 137, 218, 220, 170, 171, 172, 217–222, 168; 399/366

(56) References Cited

U.S. PATENT DOCUMENTS

| | | | |
|---|---|---|---|
| 4,636,847 | * | 1/1987 | Magi et al. ............................ 382/101 |
| 5,128,748 | * | 7/1992 | Murakami et al. ..................... 358/75 |
| 5,216,724 | * | 6/1993 | Suzuki et al. .......................... 382/165 |
| 5,343,538 | * | 8/1994 | Kasdan ................................... 382/165 |
| 5,367,577 | * | 11/1994 | Gotaas ................................... 382/135 |
| 5,375,177 | * | 12/1994 | Vaidanathan et al. ................ 382/291 |
| 5,434,649 | * | 7/1995 | Hasuo et al. .......................... 355/201 |
| 5,659,631 | * | 8/1997 | Gormish et al. ....................... 382/166 |

FOREIGN PATENT DOCUMENTS

| | | | |
|---|---|---|---|
| 0 440 129 | | 1/1991 | (EP) . |
| 0 657 839 | | 12/1994 | (EP) . |
| 649114 | * | 4/1995 | (EP) ................................. G06K/9/68 |

OTHER PUBLICATIONS

Patent Abstract Publication No. 04001878, published Jan. 7, 1992, Kashioka Motohiko, "Information Recording Paper with Mark".

Abstract No. 95–366891, European Patent Office, Hou, P., "Forming Colorimetric Mark for Preventing Forgery of Valuable Articles".

Research Disclosure 2244, No. 349, Emsworth, GB, "Registration Marks for Machine Vision", (May 1993).

* cited by examiner

Primary Examiner—Phuoc Tran
(74) Attorney, Agent, or Firm—Dickstein Shapiro Morin & Oshinsky LLP

(57) ABSTRACT

To provide an image processing device able to accurately discriminate a specified image in an input image data, the input image is converted to binary based on black and red color extraction blocks $6_{-1}$ and $6_{-2}$ in binary processing unit 1. These binary data are consolidated by an OR circuit and stored in storage device 2. Mark location detection unit 3 extracts a square mark from the image data stored in device 2. Pattern shape extraction unit 4 extracts another mark which is inside the square mark. Pattern matching unit 5 obtains and outputs the goodness of fit between the extracted marks and previously established marks.

12 Claims, 37 Drawing Sheets

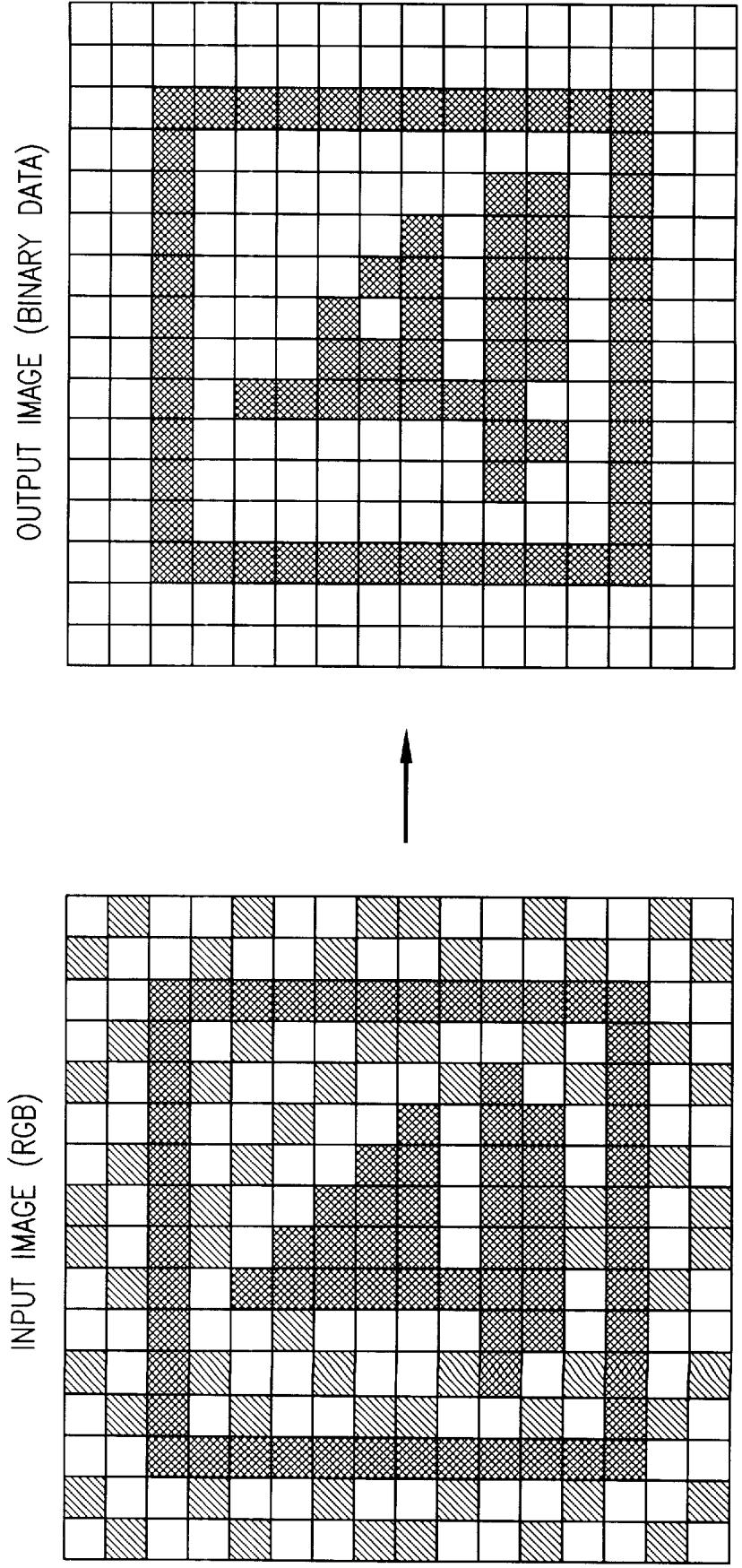

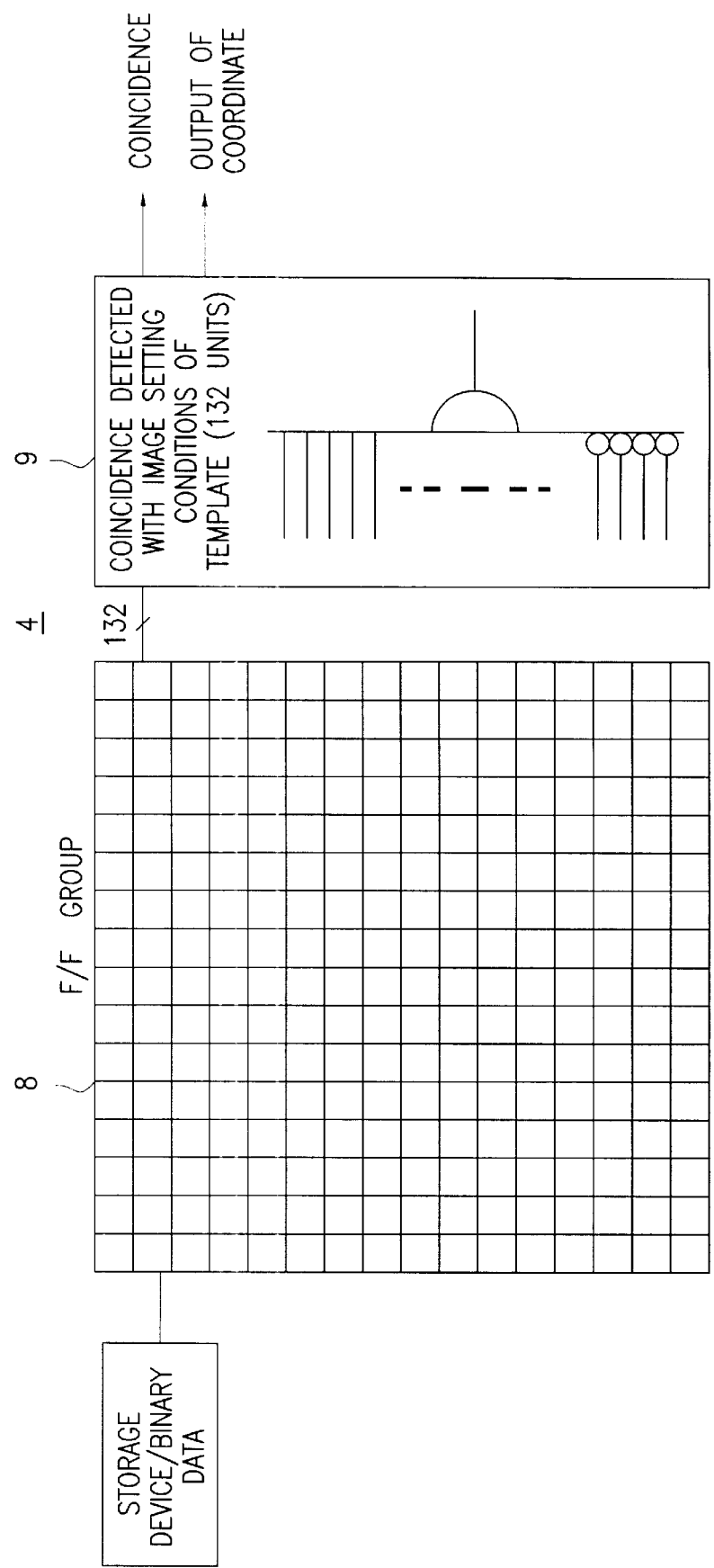

TEMPLATE

BINARY IMAGE FOR SEARCH
8a
8b
COORDINATE OUTPUT

PREDICTED DENSITY ARRANGEMENT (STORAGE DEVICE 2)

FIG. 18

| AWQ 00 | AWQ 01 | AWQ 02 | AWQ 03 | AWQ 04 | AWQ 05 | AWQ 06 | AWQ 07 | AWQ 08 | AWQ 09 |
|---|---|---|---|---|---|---|---|---|---|
| AWQ 10 | 11 | 12 | 13 | 14 | 15 | 16 | 17 | 18 | 19 |
| AWQ 20 | 21 | 22 | 23 | 24 | 25 | 26 | 27 | 28 | 29 |
| AWQ 30 | 31 | 32 | 33 | 34 | 35 | 36 | 37 | 38 | 39 |
| AWQ 40 | 41 | 42 | 43 | 44 | 45 | 46 | 47 | 48 | 49 |
| AWQ 50 | 51 | 52 | 53 | 54 | 55 | 56 | 57 | 58 | 59 |
| AWQ 60 | 61 | 62 | 63 | 64 | 65 | 66 | 67 | 68 | 69 |
| AWQ 70 | 71 | 72 | 73 | 74 | 75 | 76 | 77 | 78 | 79 |
| AWQ 80 | 81 | 82 | 83 | 84 | 85 | 86 | 87 | 88 | 89 |
| AWQ 90 | 91 | 92 | 93 | 94 | 95 | 96 | 97 | 98 | 99 |

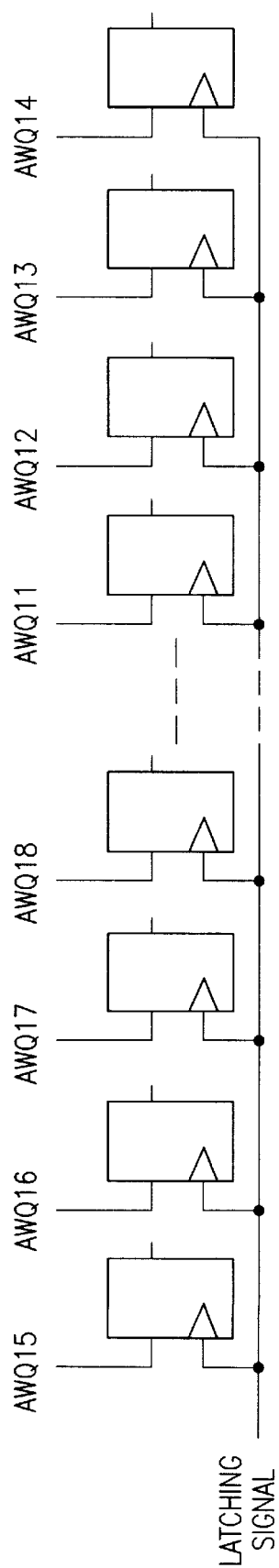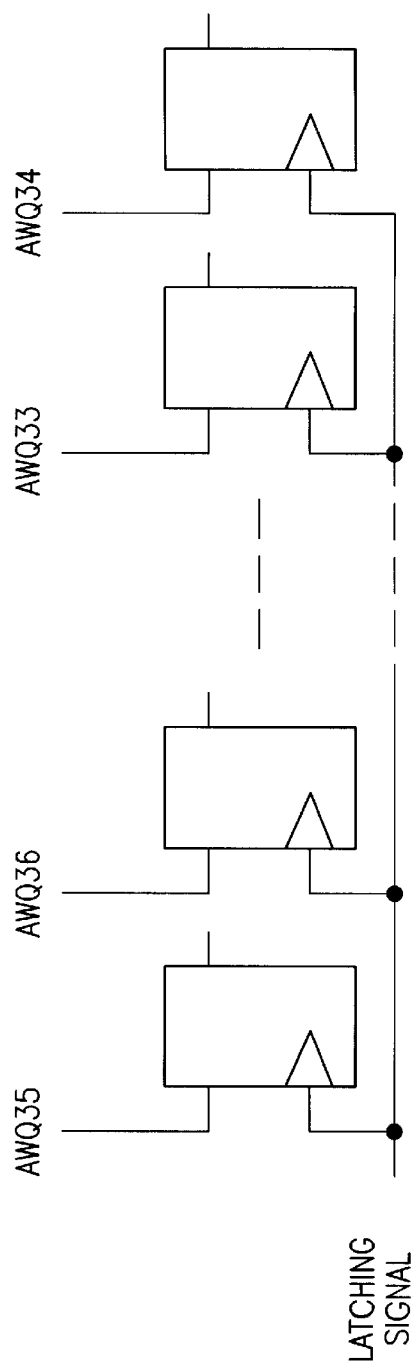

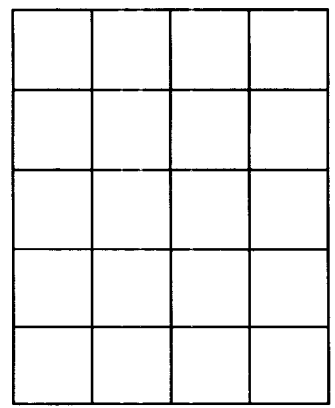
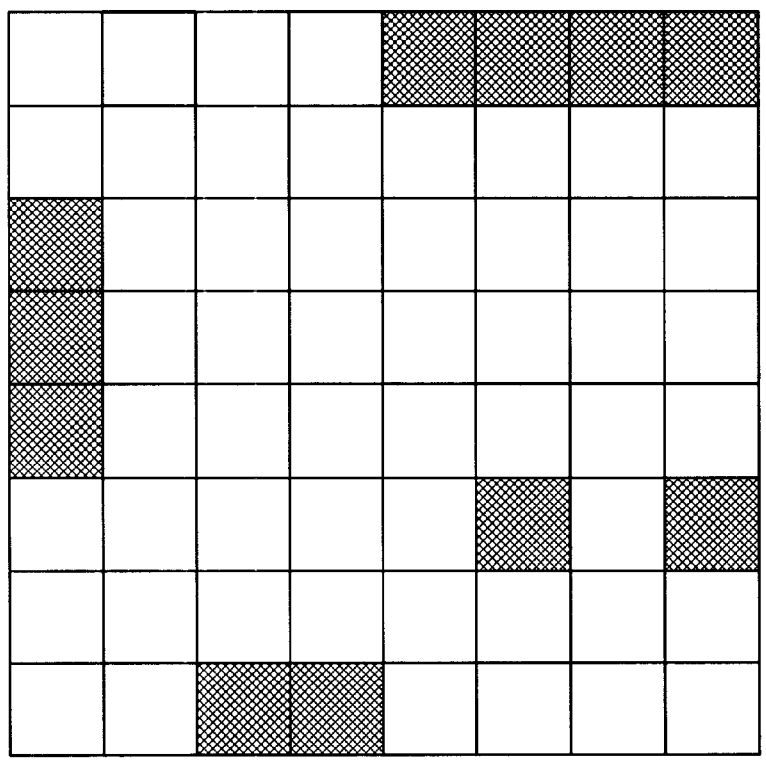
FIG. 25

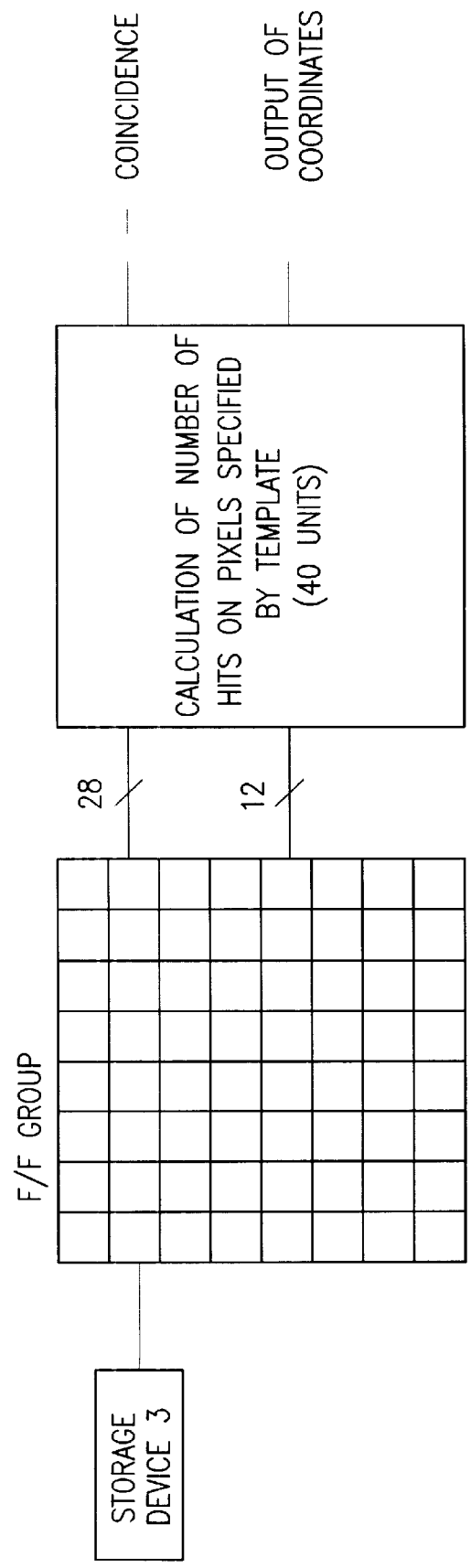

DESIGNATED PIXELS

ARRANGEMENT OF MARKS (STORAGE DEVICE 4)

IMAGE PROCESSING DEVICE FOR DETECTING ONE-COLOR MARKS OF A NUMBER OF COLORS AND IMAGE PROCESSING METHOD THEREOF

FIELD OF THE INVENTION

This invention concerns an image processing device and an image processing method which determine whether a specified image can be found in an image which has been input.

BACKGROUND OF THE INVENTION

Heretofore, copy machines have identified documents which may not legally be copied, such as bank notes, by finding a specified image on them (for example, a circle with the word "secret" in its center) or by determining the size and other features of the document.

With these types of existing methods, it sometimes happens that shapes similar to the marks that prohibit copying are found on an ordinary document, or the size of the document may be nearly identical to that of one which may not be copied. When this occurs, the document which one wishes to copy will be treated as non-reproducible, and it will not be copied. The method generally used to determine whether the document has marks on it cause the marks to stand out from the background by processing the image to separate the colors. However, when the marks and the design around them are printed in similar colors, it becomes difficult to separate and highlight only the marks and none of the surrounding image. As a result, some non-reproducible documents may not be identified as such.

Another problem occurs when the marks are of the same shape but different colors or when they are of different shapes and different colors. In these cases, we must provide as many determination processing circuits and binary memories as there are colors of marks in order to binarize the image by color separation.

SUMMARY OF THE INVENTION

One objective of the present invention is to provide an image processing device which would not mistakenly determine an ordinary document to be non-reproducible, but would not fail to identify any non-reproducible document. Another objective is to provide an image processing device which would not need either a processing circuit to determine multiple colors of marks on the document or a binary memory.

With the existing method to identify non-reproducible documents, it is generally known that reproduction of the document is prohibited when a set of marks is recognized. This means that by adding a few extra lines to the marks, one can cause the image recognition device to fail to detect them, so one will easily be able to counterfeit non-reproducible documents.

Another objective of this invention is to provide an image processing device such that simple alterations of the document will not cause recognition errors.

The image processing device in this application determines whether a specified image can be found in an image which has been input. This device is equipped with: a device which receives an input image and performs one-color extraction on a number of colors; and a device which, based on the results of extracting multiple colors, determines whether a specified image can be found in the input image.

When this image processing device is used to find a specified image (the marks indicating that copying is prohibited) composed of several colors, a determination is made for each color, so the accuracy of the final determination will be high.

An additional function of the image processing device is that the aforesaid results of extracting multiple colors are consolidated into a single result, and the aforesaid determination is based on this consolidated result. Since this image processing device consolidates the results of extracting a number of colors into a single result, the configuration of the determination unit can be simplified.

Another embodiment of this invention has an additional feature that the aforesaid input image data are divided into a number of areas, a determination is made for each area separately, and a comprehensive determination is based on the determinations made for each area. Because this image processing device makes determinations for a number of areas consisting of parts of the image and then makes an overall determination, the accuracy of the determination is enhanced.

Another embodiment of this invention has an additional feature that the location of the portion of the image to be extracted is based on reference marks, and the aforesaid determination is made using the extracted portion of the image.

Another embodiment of this invention has an additional feature that the input image is divided into a number of areas, and a determination of whether a specified image can be found in the image is based on the number of areas which meet certain conditions and/or on their spatial relationship with each other.

Another embodiment of this invention has an additional feature that it has at least two determination algorithms, one of which can be used to make the aforesaid determination. Since this image processing device uses at least two different algorithms, if one algorithm will not function because the image has been tampered with, a correct determination can be made with another algorithm.

BRIEF DESCRIPTION OF THE DRAWINGS

FIG. 4 illustrates the image as input to and output from the same binary processing unit.

FIG. 5 is a rough sketch of the mark location detection unit in the aforesaid image processing device.

FIG. 18 is a graphic representation of the flip-flop output in the same window.

FIG. 19 shows the circuit which picks up the data on the outer square of the same window unit.

FIG. 20 shows the circuit which picks up the data on the inner square of the same window unit.

FIG. 25 illustrates the way the marks are arranged in another image processing device which is also an ideal embodiment of this invention.

FIG. 26 is a block diagram of the search unit in the same image processing device.

DETAILED DESCRIPTION OF THE INVENTION

In the following, we shall give a more complete explanation of the invention with reference to an ideal embodiment.

Figure 1:
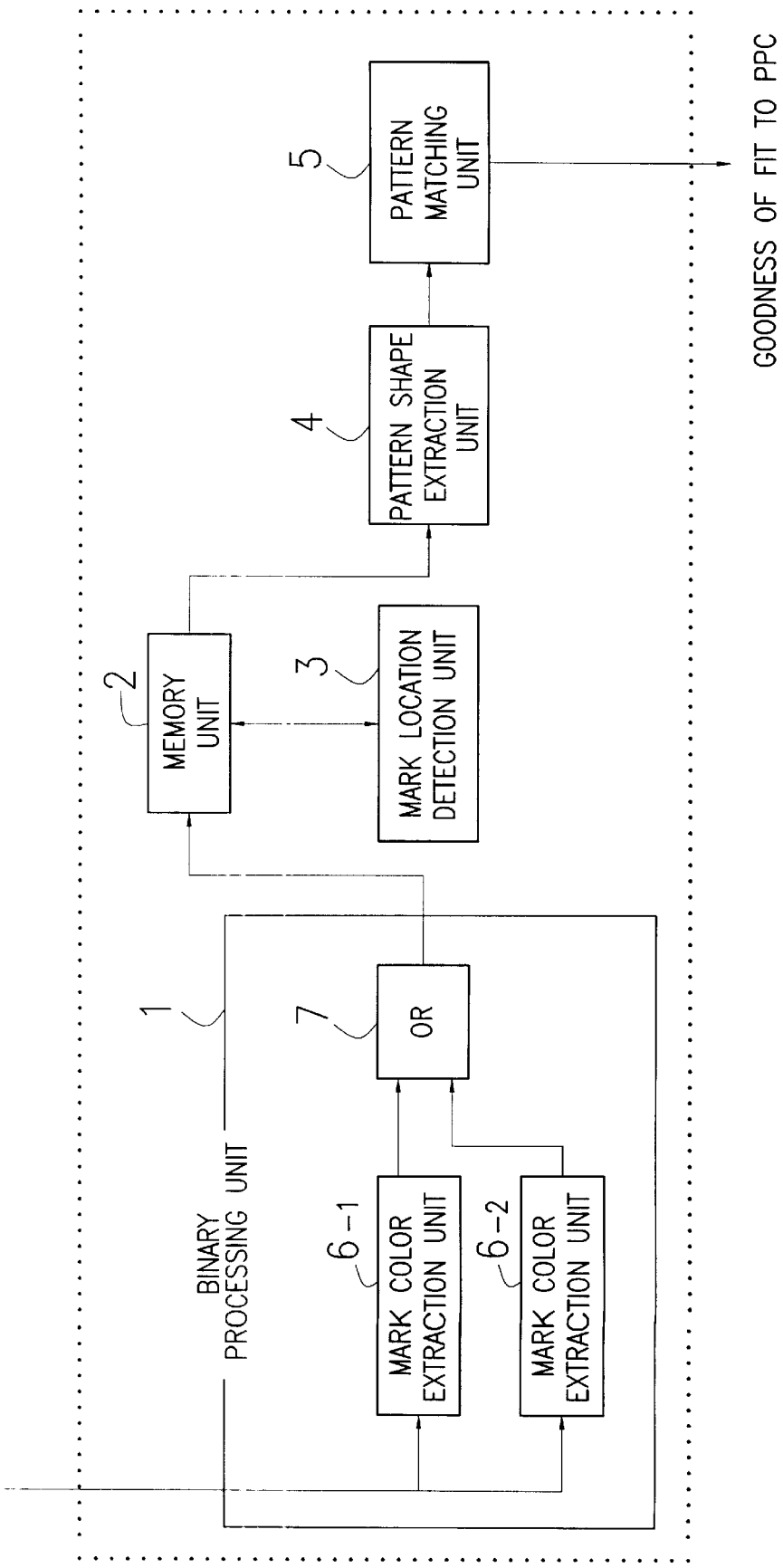
FIG. 1 is a block diagram of an image processing device which is an ideal embodiment of this invention.

FIG. 1 is a block diagram of an image processing device which is an ideal embodiment of this invention. This image processing device can determine whether a certain specified image (a set of marks) can be found in an image. It consists of binary processing unit 1, which receives image data from a PPC and binarizes them; memory unit 2; mark location detection unit 3; pattern shape extraction unit 4; and pattern matching unit 5.

Figure 2:
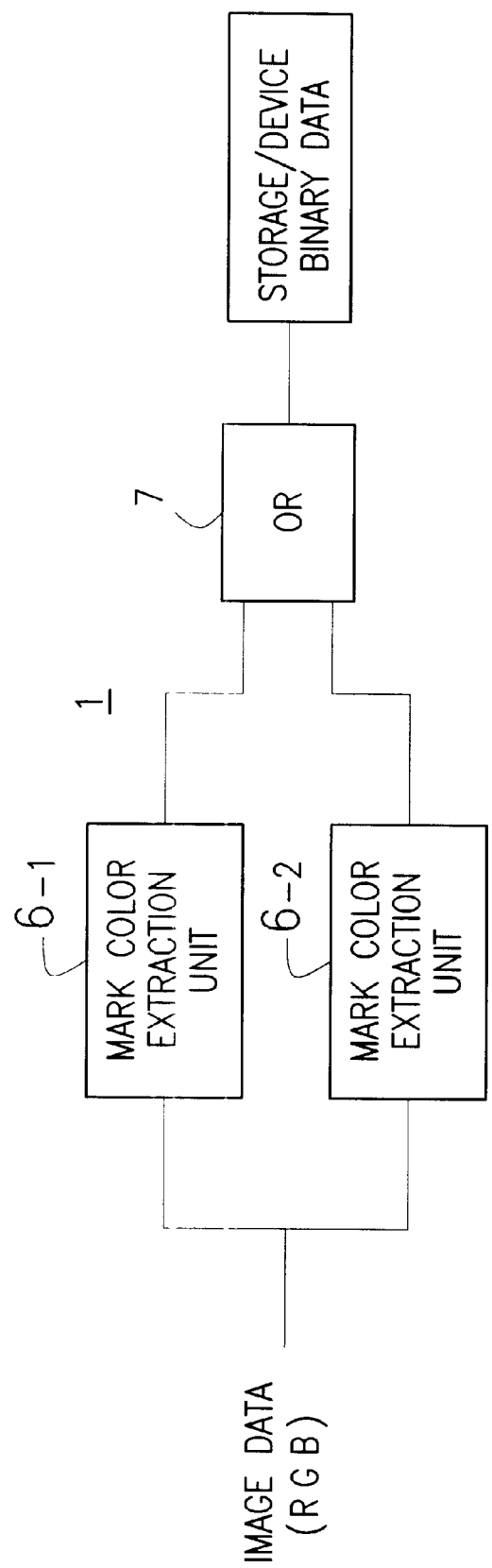
FIG. 2 is a block diagram of the binary processing unit in the same image processing device.

Binary processing unit 1, which is shown in FIG. 2, has two color extraction blocks, $6_{-1}$ and $6_{-2}$, and an OR circuit 7, which finds the logical sum of the outputs of blocks $6_{-1}$ and $6_{-2}$. Color extraction blocks $6_{-1}$ and $6_{-2}$, which are pictured in FIG. 3, have three comparators, one each for CMR, CMG and CMB, and an AND circuit which accepts their output. Upper and lower threshold values are set for all R (red), G (green) and B (blue) image data input into a color extraction block. The R, G and B input data are compared with these threshold values and if they are found to be within these values, a "1" is output. In this embodiment, input data are processed which represent a 256-color RGB image. The color extraction blocks produce two different two-color (red and black) images. Extraction block $6_{-1}$ extracts the black marks and extraction block $6_{-2}$ extracts the red marks. In color extraction block $6_{-1}$, shown in FIG. 3, the output of the CMR, CMG and CMB comparators is led through AND circuit A to obtain binary data. This is equivalent to taking the reflectivity or the signal level of the input image and changing it to a two-color R output. Without the AND circuit, however, we could not extract a color. For example, if the colors are blue and green, the pixels would appear blue or green depending on the strength of the G and B signals. To sort (and extract) a color, it is necessary to combine R, G and B in the output.

The logical sum of extraction blocks $6_{-1}$ and $6_{-2}$ is output by OR circuit 7 as binary data. The problem of noise around the marks which occurs with other color extraction methods does not arise with this system, because the locations of the marks are also specified. The marks to be found can be a dark color while the background color where they are located can be light. FIG. 4(a) shows an example of an image which is input into the aforesaid binary processing unit 1; FIG. 4(b) shows its output image, which has the form of binary data. These binary data are stored in storage device 2. The square marks in the image in FIG. 4 are the specified marks which must be discriminated.

Figure 6B:
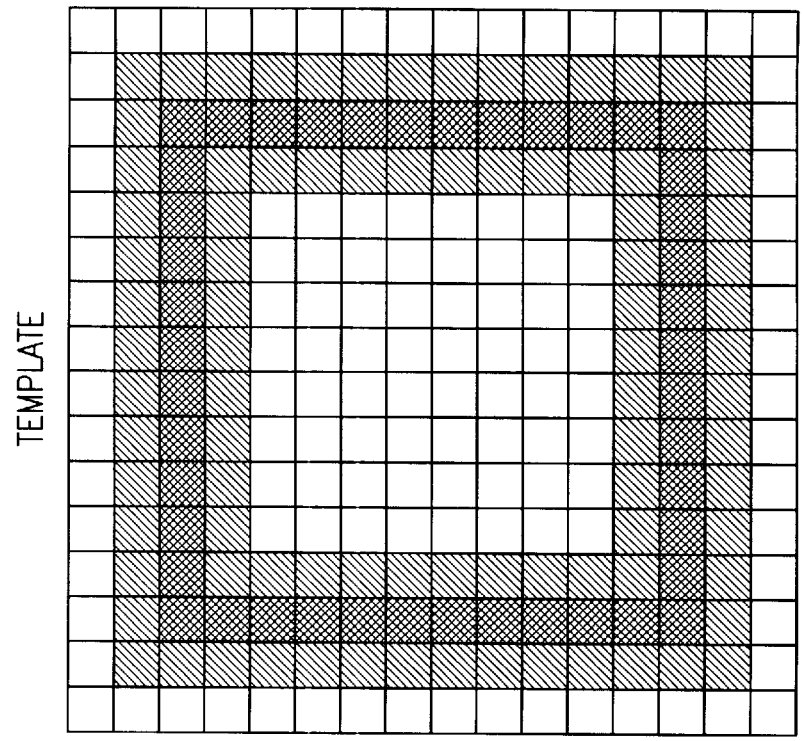
FIG. 6 shows a binary image and template which might be used for a search in the same mark location detection unit.
Figure 6A:
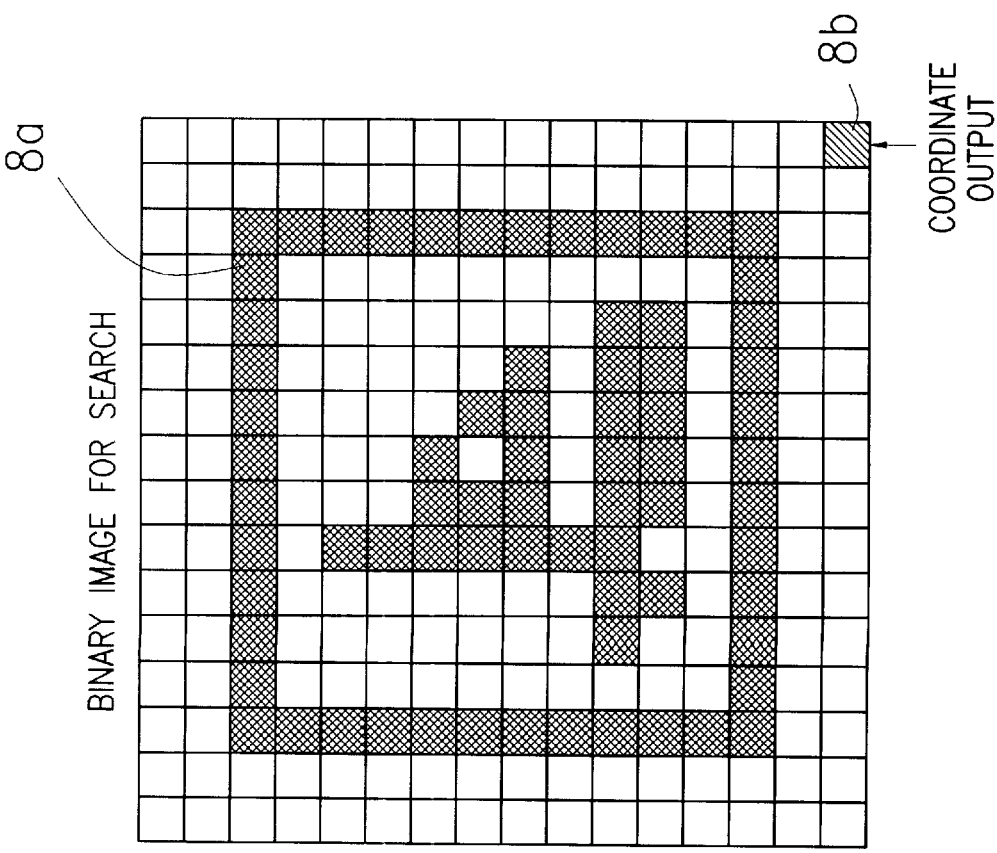

Mark location detection unit 3, pictured in FIG. 5, consists of flip-flop group 8, which is arranged in rows, and template 9. The binary data which are being searched are stored in flip-flop group 8, and square marks of a specified size are detected through a search performed using template 9. An example of a binary image to be searched is shown in FIG. 6(a) and an example of a template in FIG. 6(b). The output of flip-flop group 8 is input into template 9. If the data coincide with the template, the result of the search is output along with the coordinates 8b (the reference location) in storage device 3 which correspond to the lower right-hand corner of flip-flop group 8. In other words, the binary image is searched for a shape which coincides with the template. Here the conditions of the template are that the black square in FIG. 6(b) must consist of black pixels, and the gray squares inside and outside the black one must consist of white pixels. In the example in FIG. 6, the image which is searched meets the conditions of the template, so mark 8a, the outer square, has been detected. The coordinates (the address) in storage device 2 which correspond to pixel $8_b$ in the lower right-hand corner of flip-flop group 8 are output.

Pattern shape extraction unit 4 reads out of storage device 2 the binary data corresponding to the interior of the square mark detected by detection unit 3. Pattern matching unit 5 uses fuzzy matching to compare the extracted image with a recorded pattern in order to determine whether this image is the mark which identifies a document as non-reproducible.

As the first step in the matching process, pattern shape extraction unit 4 extracts from memory unit 2, based on the coordinates output by mark location detection unit 3, the section of the image which is needed for fuzzy matching. Since fuzzy matching is executed using the density of each of the smaller areas into which the mark has been divided (in this case each area is 6×6 pixels for a total of four areas), the density of each extracted area is obtained.

Figure 7:
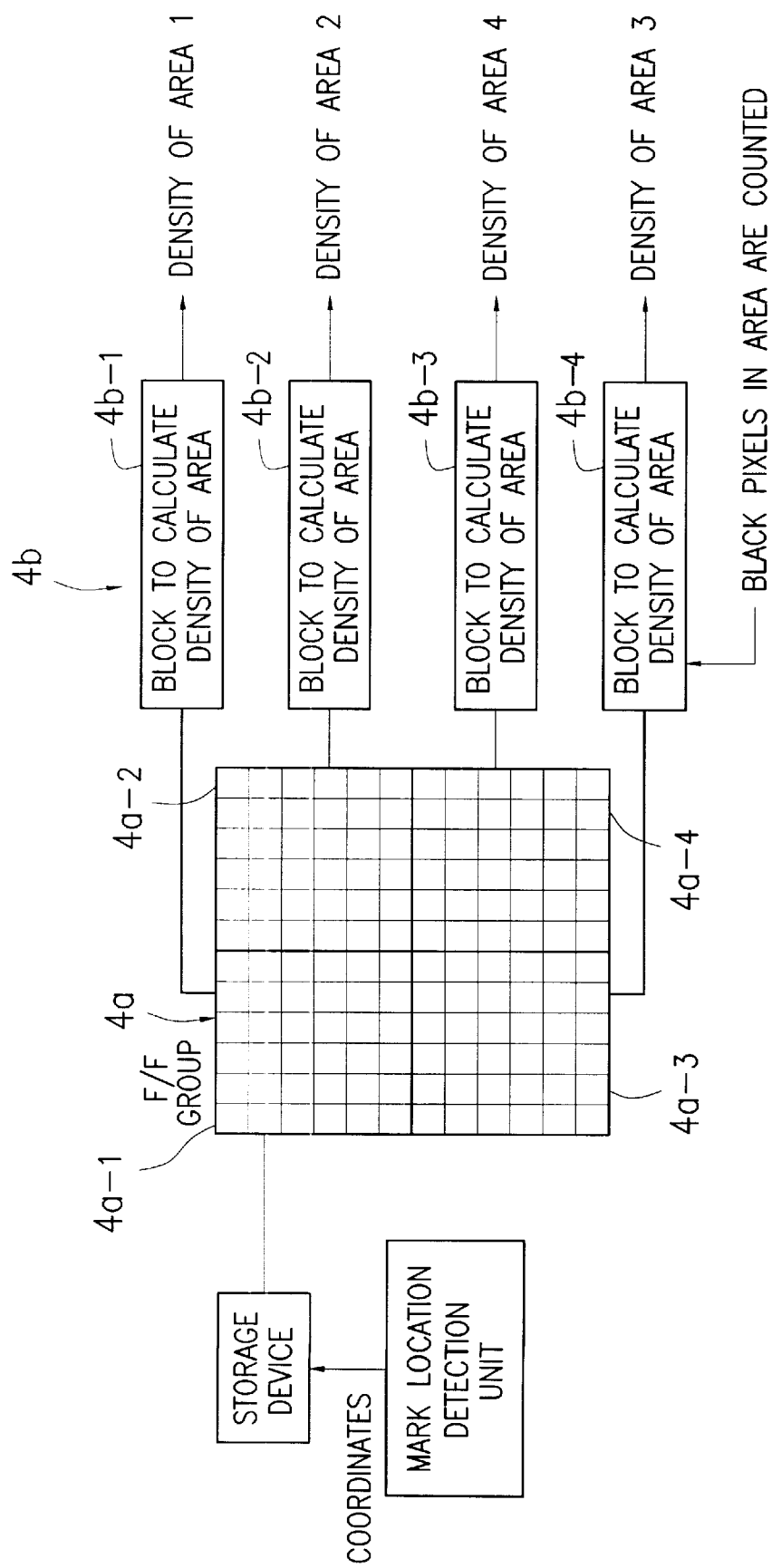
FIG. 7 is a rough sketch of the pattern shape extraction unit in the aforesaid image processing device.
Figure 8:
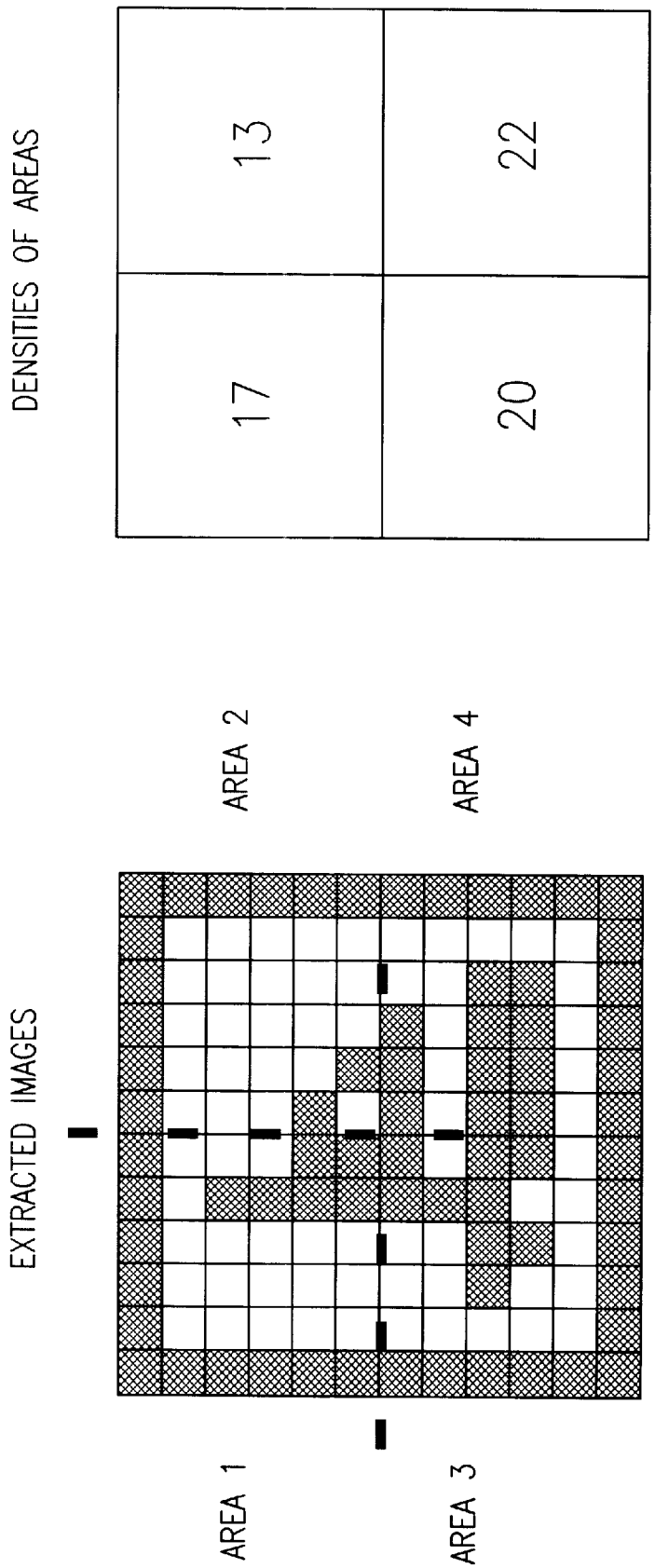
FIG. 8 illustrates the extraction processing executed by the same pattern shape extraction unit.

FIG. 7 shows an example of image extraction. Pattern shape extraction unit 4 consists of 12×12 flip-flop group 4a and blocks 4b, which calculate the densities of the four areas. The image of the interior of the square mark which is transmitted from storage device 2 to flip-flop group 4a is divided into four areas, $4_{a-1}$, $4_{a-2}$, $4_{a-3}$ and $4_{a-4}$. Blocks $4_{b-1}$, $4_{b-2}$, $4_{b-3}$ and $4_{b-4}$ calculate the density of each of the four areas and output the density for each area. When the binary image shown in FIG. 6(a) has been divided into areas 1 through four as in FIG. 8, the density of each area can be found by counting the black pixels in that area. The output values for the area densities in FIG. 6(a) would be 17 for area 1; 13 for area 2; 20 for area 3; and 22 for area 4.

Figure 9:
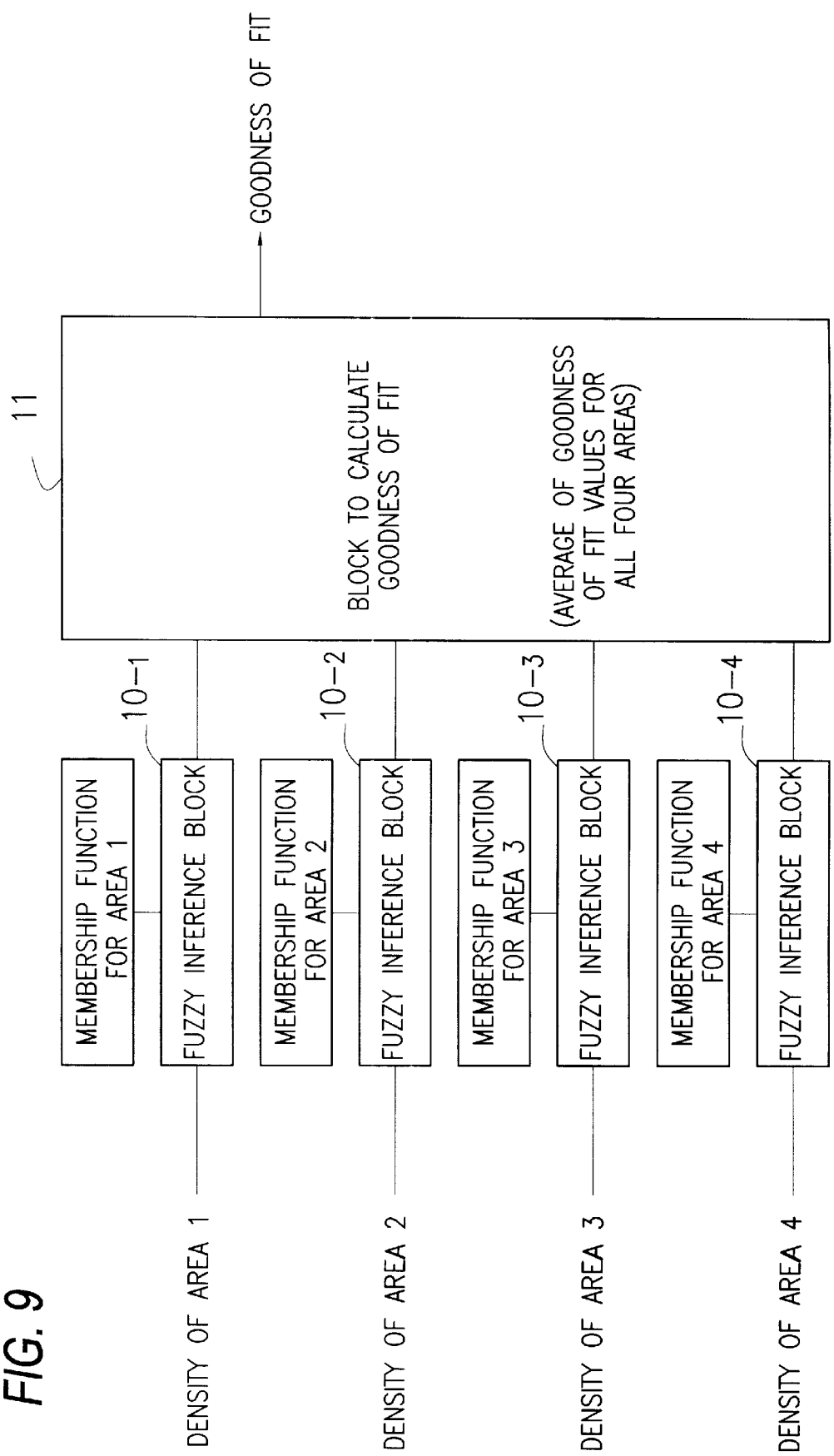
FIG. 9 is a block diagram of the pattern matching unit in the aforesaid image processing device.

Pattern matching unit 5 is pictured in FIG. 9. It has four fuzzy inference blocks, $10_{-1}$ through $10_{-4}$, and a calculation block, 11. The fuzzy inference blocks receive the density values output by pattern shape extraction unit 4 for the four areas, and they also receive previously recorded membership functions for those areas with respect to the mark which prohibits copying (the specified mark). They determine, according to a rule, the goodness of fit of the image in each area with respect to a reference pattern. (This pattern is the mark which prohibits copying, in this case a square and the markings inside it: See FIG. 6(a).) The four goodness of fit are output to block 11, which calculates the final goodness of fit by finding the average of the four values.

Figure 10:
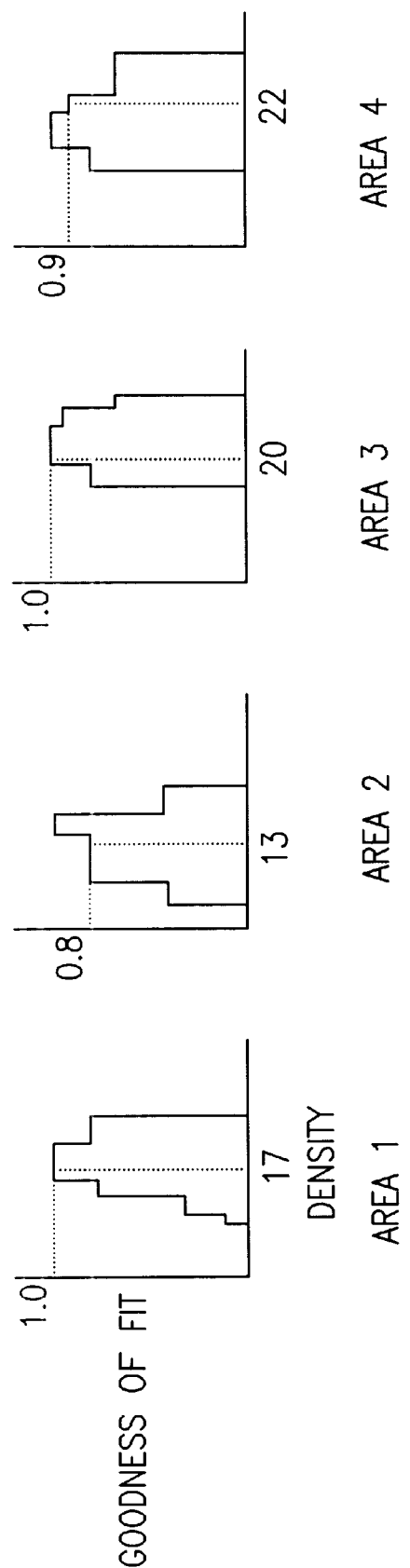
FIG. 10 gives the membership functions for the four areas used by the same pattern matching unit.

Examples of membership functions showing the relationship between the density of each area and its goodness of fit are given in FIG. 10. Using the density values output by pattern shape extraction unit 4 and the membership functions pictured in FIG. 10, we find that the goodness of fit of area 1 is 1.0; that of area 2 is 0.8; that of area 3 is 1.0; and that of area 4 is 0.9. The overall goodness of fit of the mark would be the average of the four values, or 0.925.

It is assumed in the above example that the mark is oriented at 0 deg. An actual mark might alternatively be rotated by 90 deg., 180 deg. or 270 deg. In an actual case, then, the image would also be matched against membership functions for the different degrees of rotation.

The goodness of fit is calculated as above and output to a PPC. If the goodness of fit exceeds the value which indicates that the image is the mark in question, the PPC prohibits the copying operation.

We shall next discuss another ideal embodiment of this invention. In the embodiment described below, at least two types of marks are recognized by different algorithms. This method will prevent recognition errors from occurring when the marks have been defaced in only one way.

Figure 11:
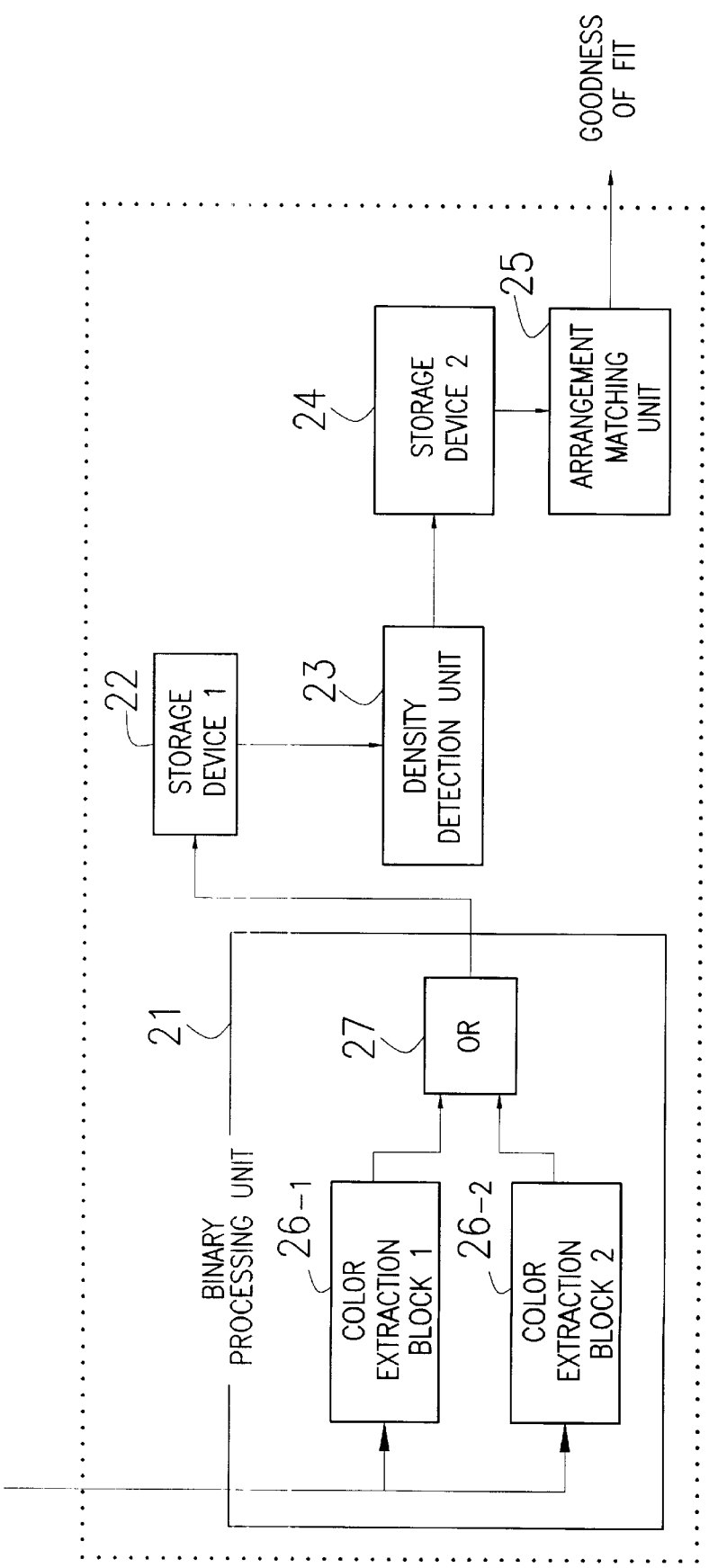
FIG. 11 is a block diagram of another image processing device which is an ideal embodiment of this invention.

As can be seen in FIG. 11, the image processing device of this embodiment consists of binary processing unit 21; storage device 22; density detection unit 23; storage device 24; and arrangement matching unit 25. Binary processing unit 21 and storage device 22 are identical to units 1 and 2 pictured in FIGS. 1, 2 and 3.

Figure 13:
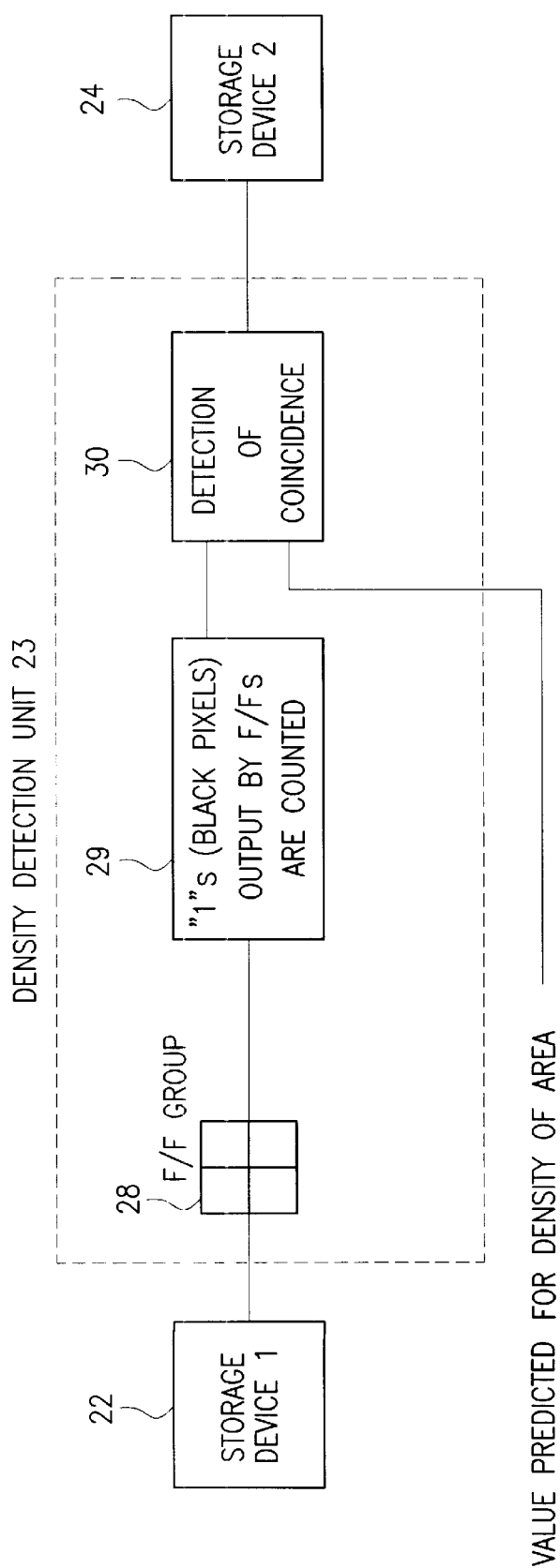
FIG. 13 is a block diagram of the density detection unit in the same image processing device.

Density detection device 23, which is shown in FIG. 13, consists of flip-flop group 28; counter unit 29, which counts the "1"s (representing black pixels) in flip-flop group 28; and detection unit 30, which detects the coincidence of the count value with the density value predicted for the area.

Figure 12:
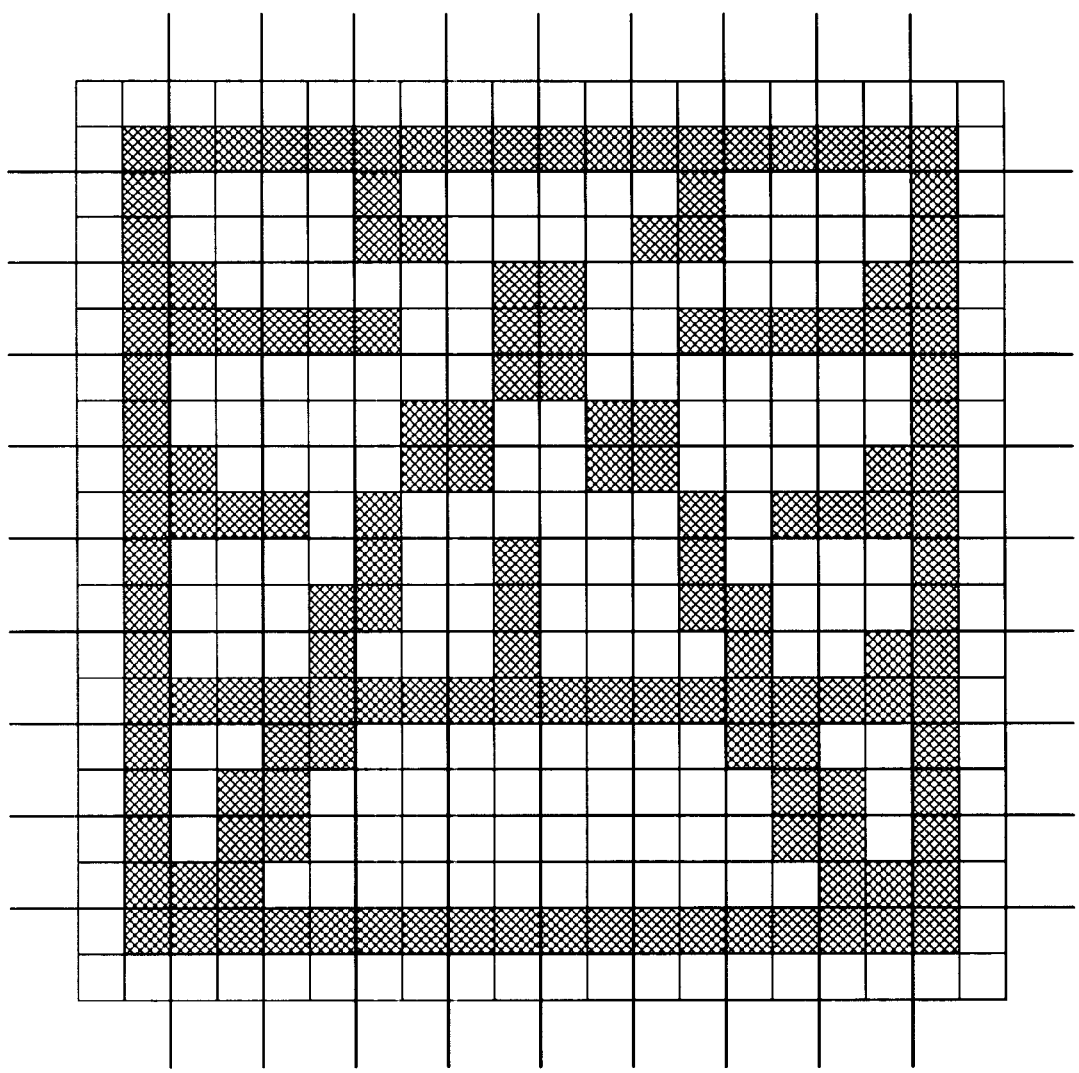
FIG. 12 shows a binary image which is stored in the same image processing device.
Figure 14:
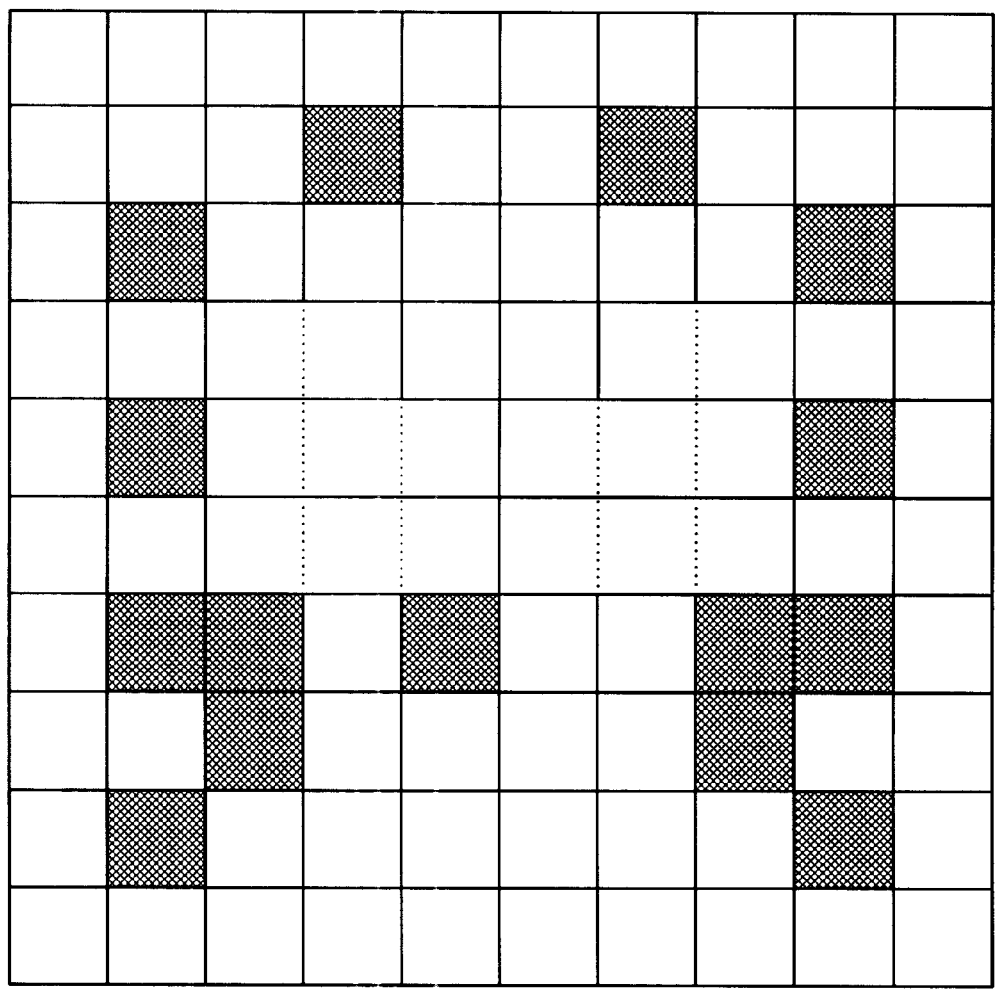
FIG. 14 shows the predicted density arrangement used in the same image processing device.

In the image processing device of this embodiment, the input image is binarized by binary processing unit 21 and stored in storage device 22. An example of such a binary image is given in FIG. 12. This binary image is converted into density values for areas measuring 2×2 pixels. Since each 2×2 pixel area contains four pixels, there are five possible density values: 4, 3, 2, 1 or 0. For each area, the "1"s (black pixels) are set in flip-flop group 28, the number of "1"s is counted by counter unit 29, and this value is compared with the predicted density value for that area by detection unit 30. If the predicted value is, say, "3" and the count is also "3", a "1" is stored for that area in storage device 24. If the count value is a number other than "3", a "0" is stored. The predicted distribution of densities which should be attained by converting the density values in the binary image shown in FIG. 12 in this way is shown in FIG. 14. The black squares in FIG. 14 are 2×2 pixel areas with density values of "3".

Figure 15:
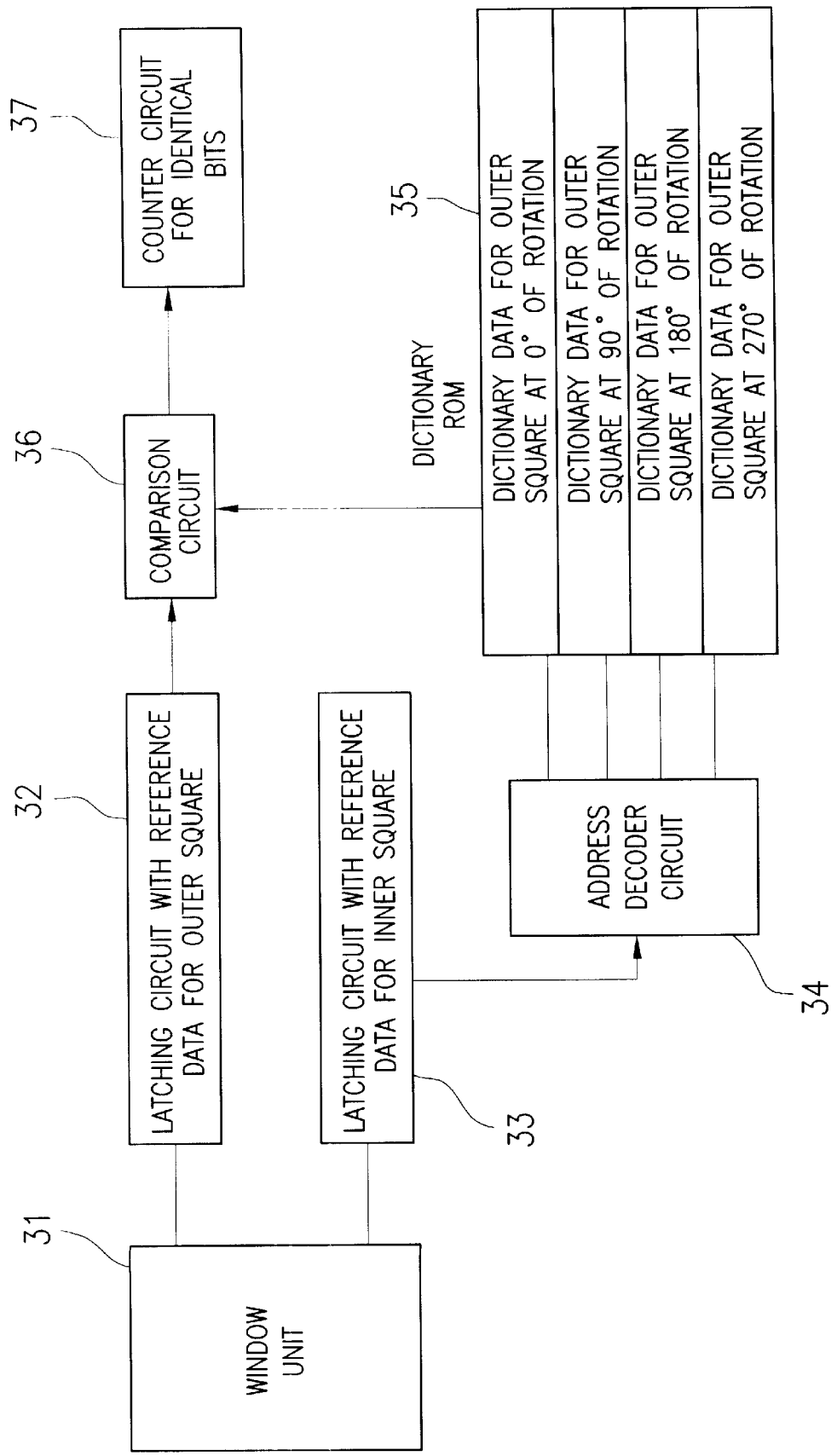
FIG. 15 is a block diagram of the arrangement matching unit in the same image processing device.

Arrangement matching unit 25 compares the density distribution which is found (FIG. 14) with a recorded pattern to determine whether this is the image which is the target of our search. We shall next discuss matching unit 25. As can be seen in FIG. 15, matching unit 25 consists of window unit 31; data latching circuit 32 for the outer square; data latching circuit 33 for the inner square; address decoder circuit 34; dictionary ROM 35; comparison circuit 36; and identical bit counter circuit 37.

Figure 16:
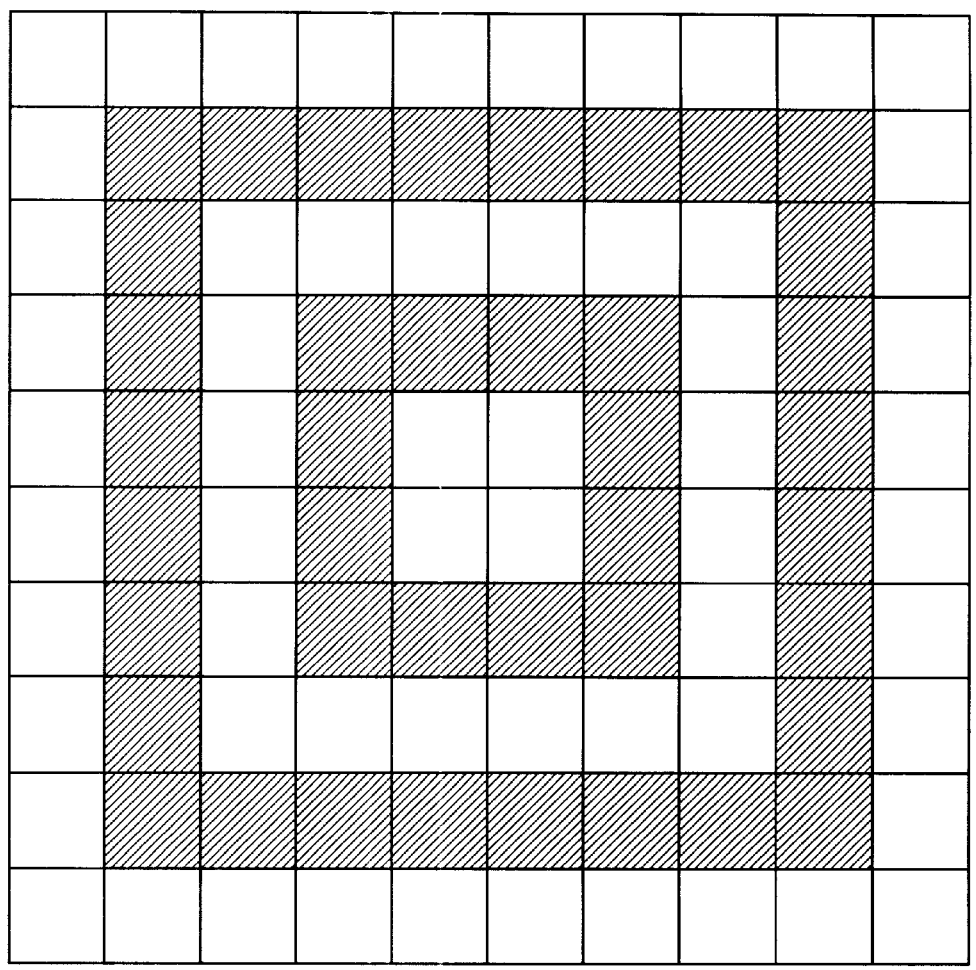
FIG. 16 is a graphic representation of the window unit in the same image processing device.
Figure 17:
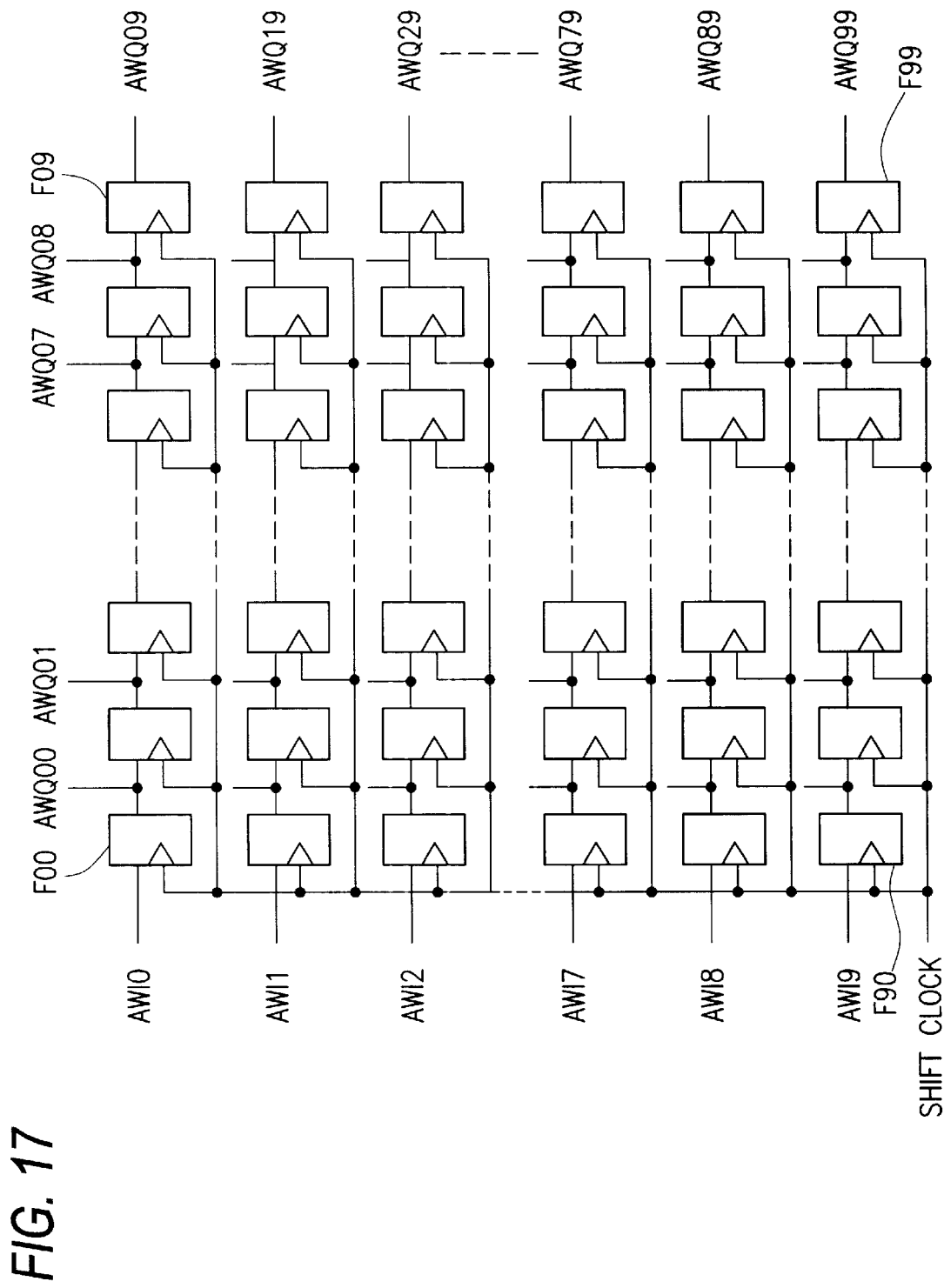
FIG. 17 is a block diagram of the same window.

FIG. 16 is a graphic representation of window unit 31. The window unit is used to detect the areas on the two squares marked by hatching which have density value "1" (black). In other words, it finds the areas valued "1" in FIG. 14 which are located on the squares. FIG. 17 gives a detailed illustration of the window unit. This window unit consists of 10×10 flip-flops, $F_{00}$ through $F_{99}$. Each set of ten flip-flops is lined up in the form of a shift register. The inputs to the shift registers are $AW_{10}$ through $AW_{19}$; the outputs from the flip-flops are $AWQ_{00}$ through $AWQ_{99}$. The location data for a mark (an area valued "1") move successively according to a shift clock. FIG. 18 shows the outputs of window flip-flops $F_{00}$ through $F_{99}$ in graphic form. Only data on the two squares shown in FIG. 16 will be picked up. FIGS. 19 and 20 are the circuits which pick up the data on the inner and outer squares respectively. These circuits latch the signals for the window unit which correspond to the inner and outer squares as the window is moved over the entire image.

Figure 21:
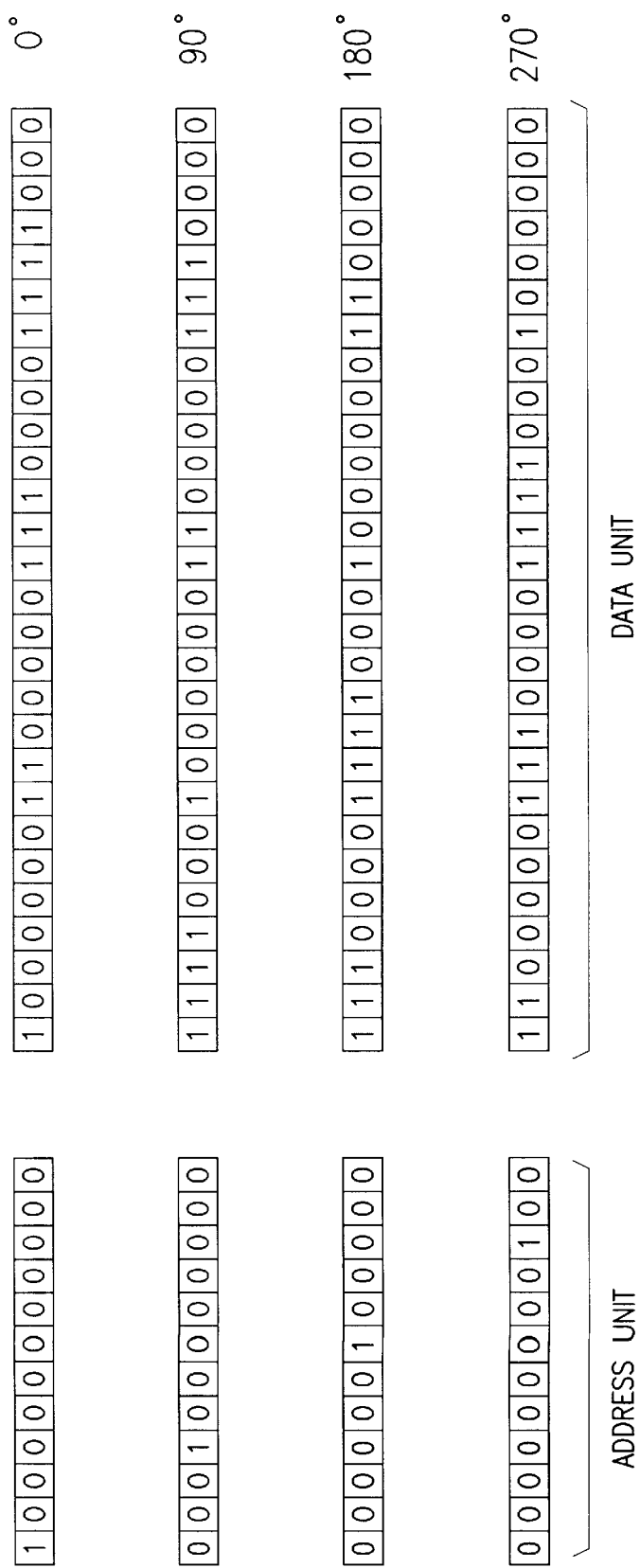
FIG. 21 illustrates the internal data in the dictionary ROM in the arrangement matching unit in FIG. 15 above.

The data latched in latching circuit 33 for the inner square (FIG. 15) are connected to the address bus for dictionary ROM 35. When they are addressed by address decoder circuit 34, the dictionary data corresponding to the angle at which the document is read are found among the data sets for the inner square stored in ROM 35 at 90 degree intervals of rotation, and these data are output. FIG. 21 shows the internal data configuration of dictionary ROM 35, viz, its address unit and its data unit. The orientation of the square can be determined by which areas in the inner square are valued "1". The data are read out of dictionary ROM 35 in order to find out for each address with a "1" whether the data for corresponding locations on the outer square will be "1" or "0". The data read out of dictionary ROM 35 are compared with reference data for the outer square by comparison circuit 36. The dictionary data are compared with reference data for the outer square bit by bit and loaded into the shift register. If the reference data and dictionary data loaded in the shift register match, all 28 bits will be "1". If none of them match, all 28 bits will be "0". By counting the "1"s in the shift register, then, we can calculate how well the two images match, i.e., the goodness of fit.

The "1"s in the shift register are counted by inputting bit strings from the register into counter circuit 37 according to a shift clock. By counting the bit strings we arrive at the total number of "1"s.

Figure 22:
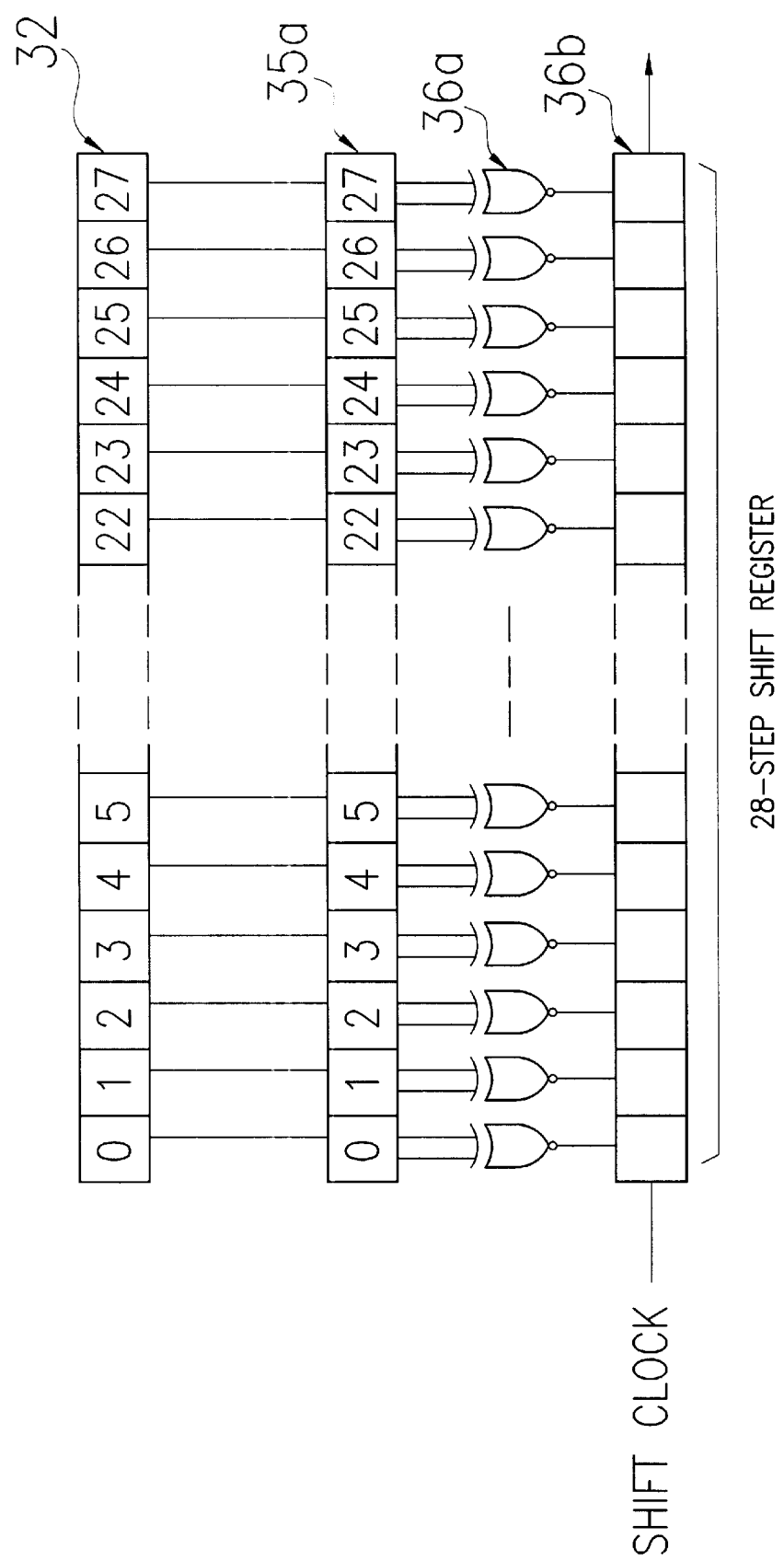
FIG. 22 is a block diagram of the comparison circuit in the same image processing device.

FIG. 22 shows an example of an actual circuit which could be used for comparison circuit 36. Circuit 36 consists of 28 coincidence (exclusive OR) circuits 36a, which accept as input all the bit outputs of latching circuits 32, the circuits which latch the reference data for the outer square, and all the bit outputs of latching circuits 35a, which latch the dictionary data contained in dictionary ROM 35; and shift register 36b, which loads the output of each coincidence circuit 36a and outputs the 28 bit outputs which are loaded serially according to a shift clock. As explained above, the output of shift register 36b is input into the counter 37 pictured in FIG. 15.

Figure 23:
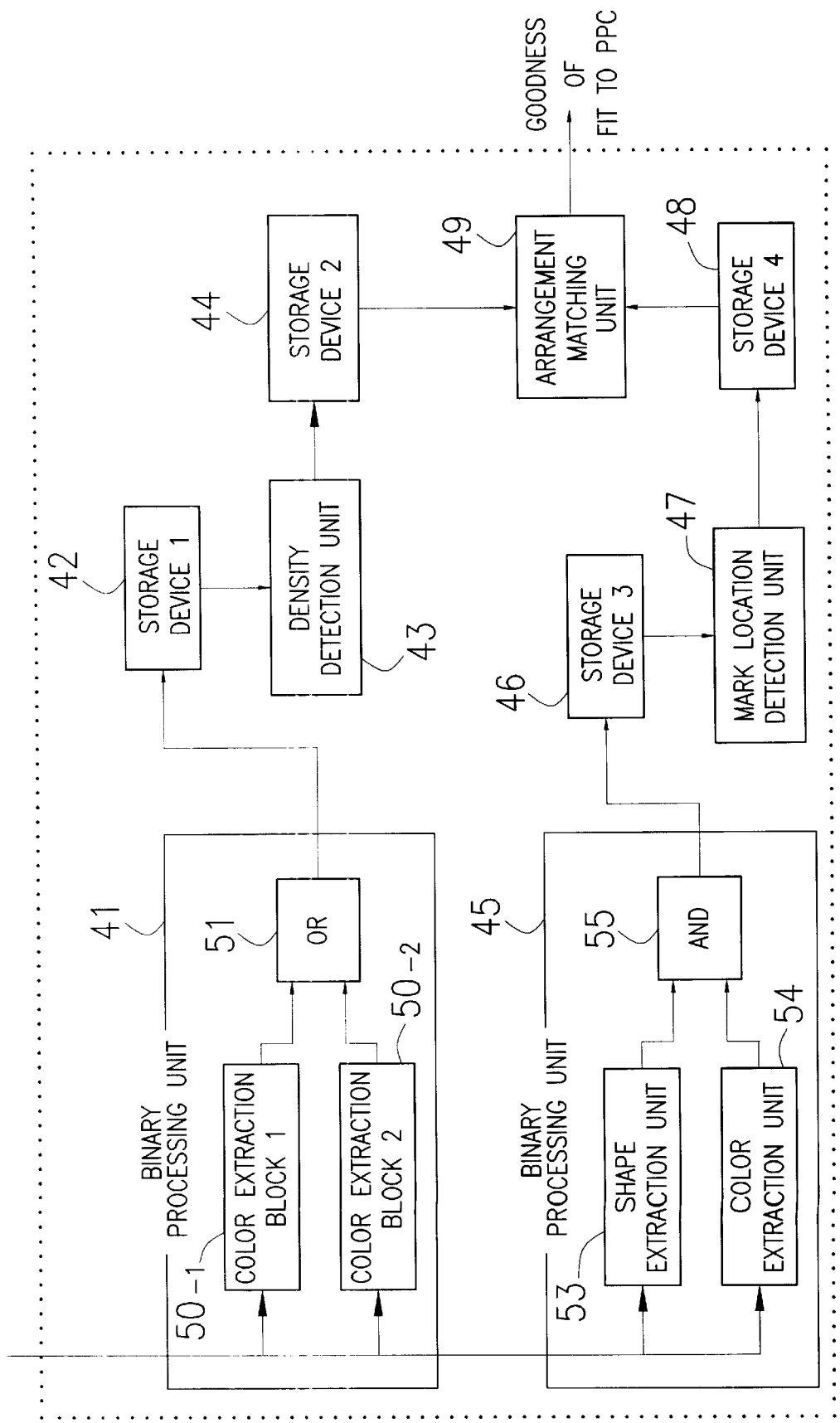
FIG. 23 is a block diagram of another image processing device which is an ideal embodiment of this invention.

FIG. 23 is a block diagram showing the configuration of another image processing device which is an ideal embodiment of this invention. This image processing device consists of binary processing unit 41; storage device 42; density detection unit 43; storage device 44; binary processing unit 45; storage device 46; mark location detection unit 47; storage device 48; and arrangement matching unit 49, which matches the data stored in devices 44 and 48. Binary processing unit 41 consists of color extraction blocks 50$_{-1}$ and 50$_{-2}$ and OR circuit 52, which outputs the logical sum of the outputs of blocks 50$_{-1}$ and 50$_{-2}$. Binary processing unit 45 consists of shape extraction unit 53; color extraction unit 54; and AND circuit 55, which receives the output of extraction units 53 and 54 and outputs it as a logical product. The PPC inputs the image data into binary processing units 41 and 45 in parallel. The output of shape extraction unit 53 and that of color extraction unit 54 must be output through AND circuit 55 because if shape extraction unit 53 extracts, say, triangular marks, it will extract all triangular marks regardless of whether they are yellow, green, red or blue. Color extraction unit 54 extracts data only by color, so it will extract circular, odd-shaped and square marks. To extract blue triangular marks, we must find the logical product of the two outputs. Binary processing unit 41 is identical to processing unit 1 in FIG. 1. Binary processing 45 will be discussed shortly.

Figure 24:
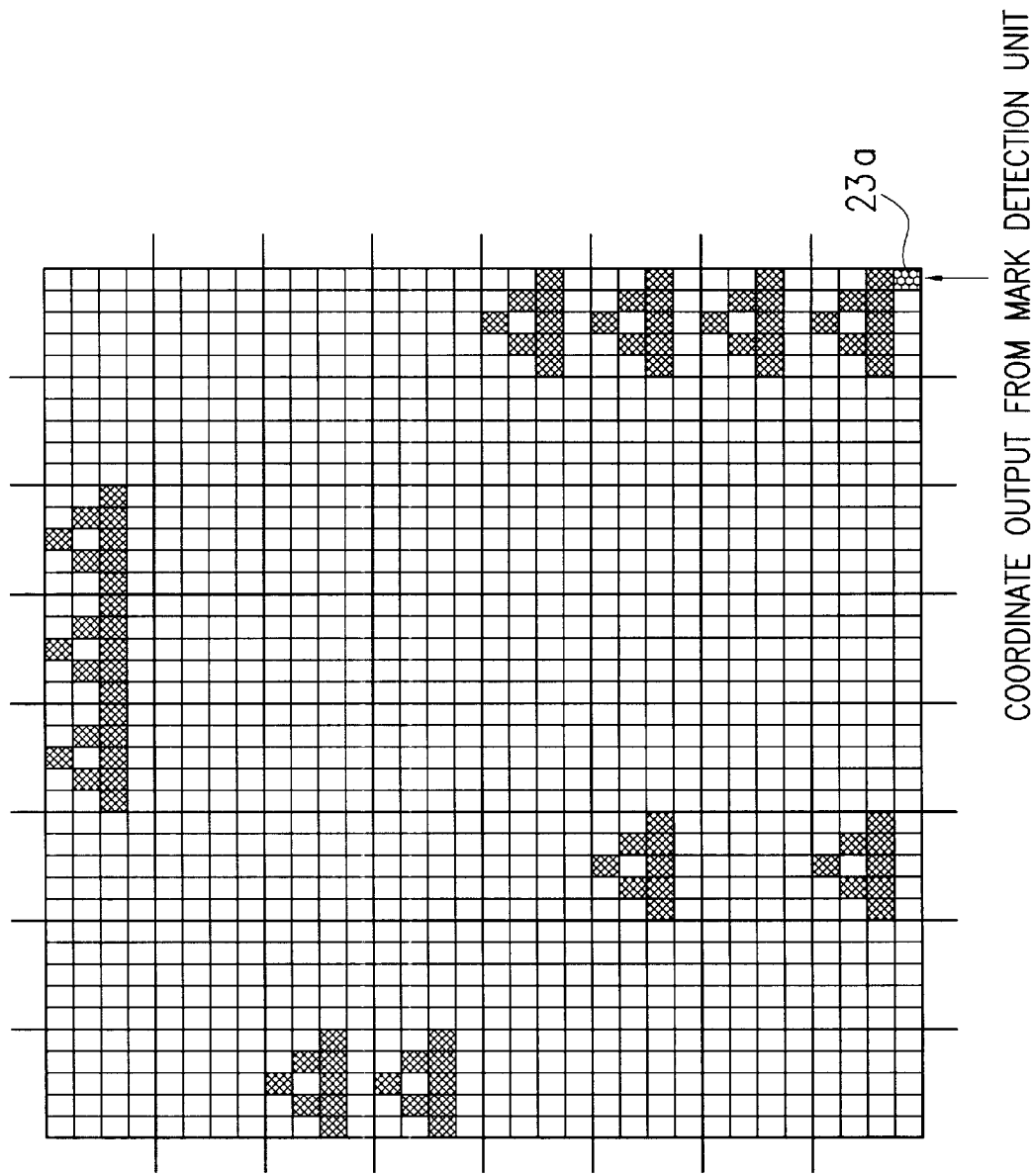
FIG. 24 shows an example of a binary image which might be stored in the same image processing device.

With the image processing device of this embodiment, as can be seen in FIG. 24, data representing a binarized input image are divided into a number of 5×4 pixel areas. Small marks are placed in a predetermined number of these areas. These marks might, for example, be triangles formed so that pixel line three reads "1, 1, 1, 1, 1", pixel line two reads "0, 1, 0, 1, 0" and pixel line one reads "0, 0, 1, 0, 0", where "1" indicates a colored pixel. The marks are defined only as small marks; other appropriate shapes would also be acceptable. The areas with the marks are in a fixed relationship with each other which constitutes the image which is to be found.

Figure 3:
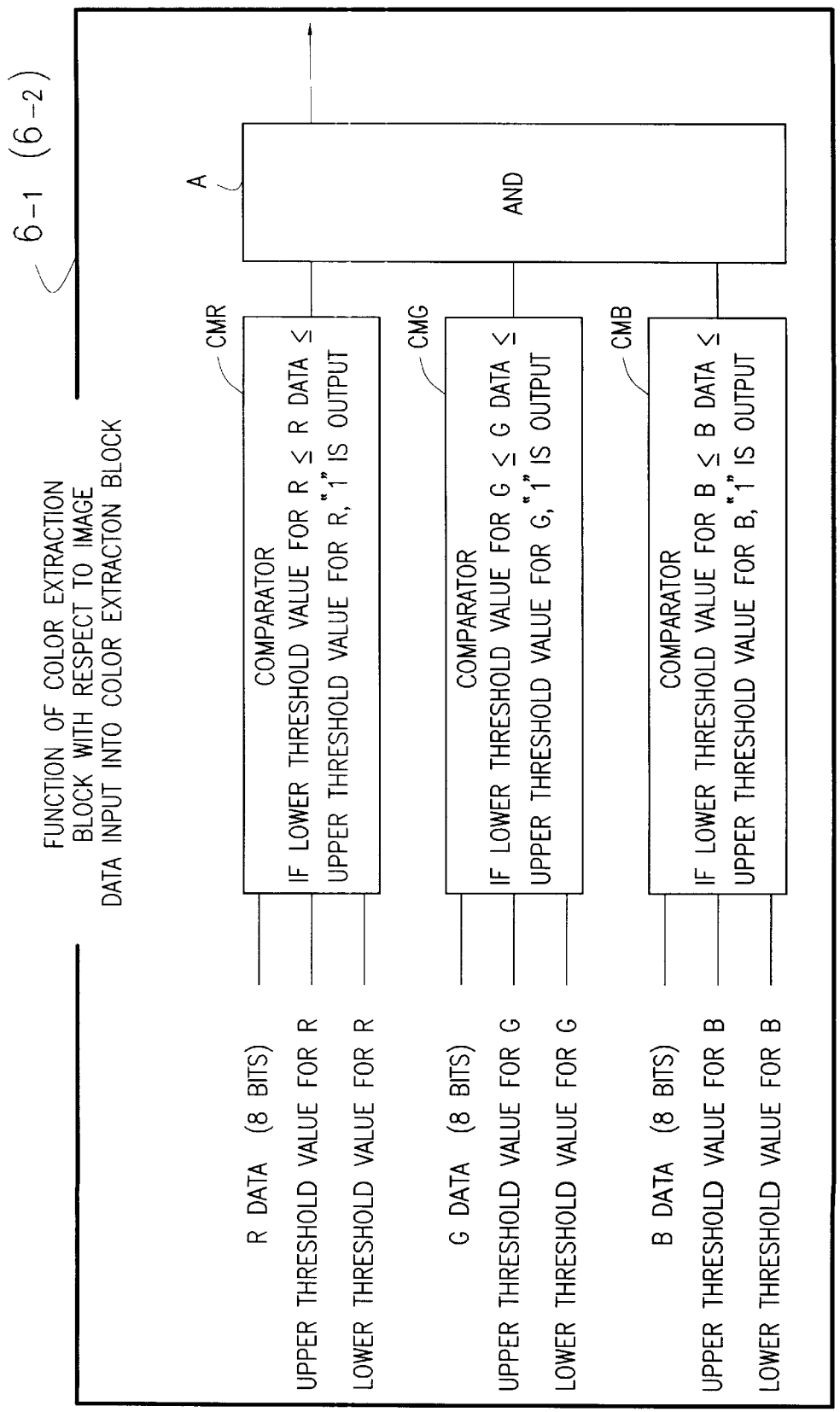
FIG. 3 is a block diagram illustrating the function of the color extraction blocks in the same binary processing unit.

Just as is shown in FIGS. 2 and 3, color extraction block 50$_{-1}$ of binary processing unit 41 binarizes the black pixels in the input image, while extraction block 50$_{-2}$ binarizes the red. The binary data pass through OR circuit 51 and both outputs are stored in storage device 42. The binary data stored in device 42 are shown in FIG. 24.

Using the binary data stored in device 42, density detection unit 43 detects the black pixels in each 5×4 pixel area and finds the total number of "1"s in it. An area with a given number of "1"s, say eight, will be given a "1"; other areas will be given a "0". The binary data stored in device 44 are identical to those shown in FIG. 27(a). By the density of each area, these binary data indicate the locations where marks are detected. Density detection unit 43 is identical to the device shown in FIG. 13.

The image data input into binary processing unit 45 are binarized according to shape by shape extraction unit 53. Color extraction unit 54 converts the data to binary according to color. The logical product of the outputs of extraction units 53 and 54 is found by AND circuit 55, and the new binary data are stored in storage device 46.

The data stored in device 46 are identical to those pictured in FIG. 24. Mark location detection unit 47 detects the marks in each area using a template and stores a "1" at every address in storage device 48 which corresponds to the coordinates of a detected mark. The binary data are shown in FIG. 27(a). These data represent the conversion of a 5×4 pixel area into a single pixel; they are compressed 20 to 1.

Figure 27B:
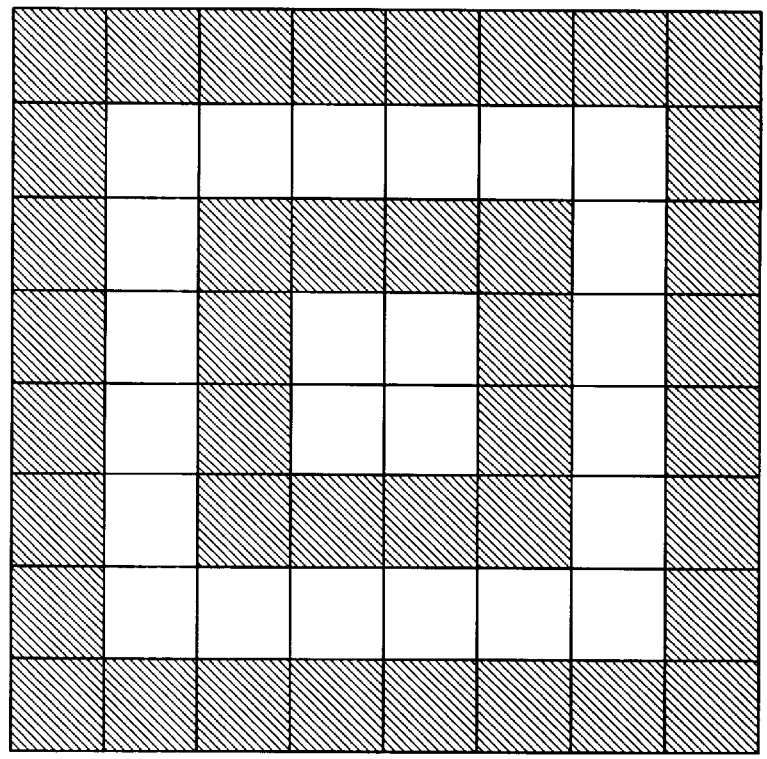
FIG. 27 shows the arrangement of marks and the specified pixels in order to explain the search performed by the same search unit.
Figure 27A:
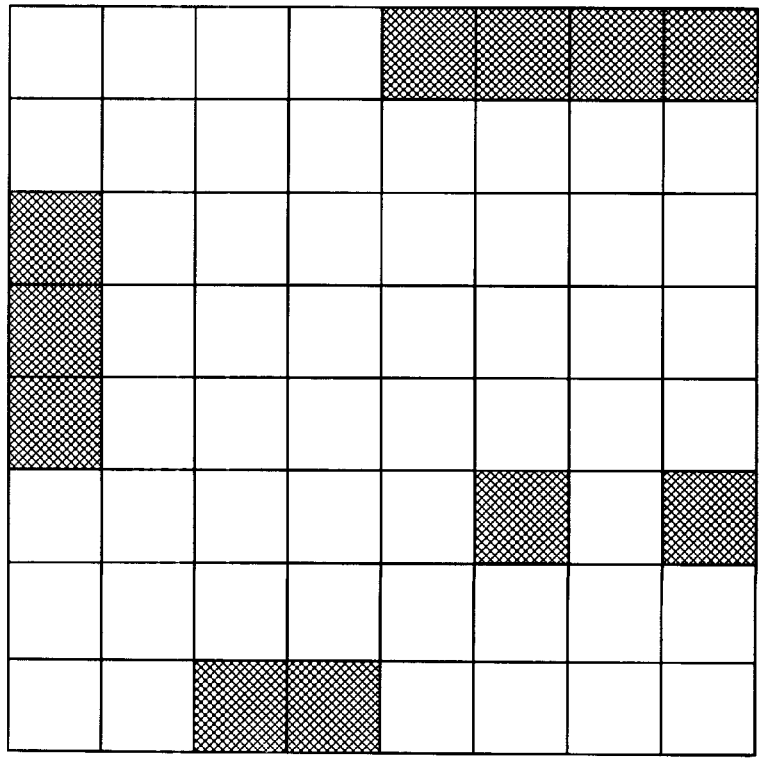

Arrangement matching unit 49 compares the reference data for the outer square which are stored in storage device 44 with the dictionary data for the outer square shown in FIG. 27(b), and outputs their degree of coincidence to the PPC as goodness of fit. As an alternative, arrangement matching unit 49 could compare the reference data for the outer square which are stored in storage device 48 with the dictionary data for the outer square and output their degree of coincidence to the PPC as goodness of fit. In this embodiment of the image processing device, arrangement matching unit 49 could be used both to detect the marks by checking the density of each area and to detect the marks in specified areas (to find whether there are a given number of marks around a specified mark).

Figure 28:
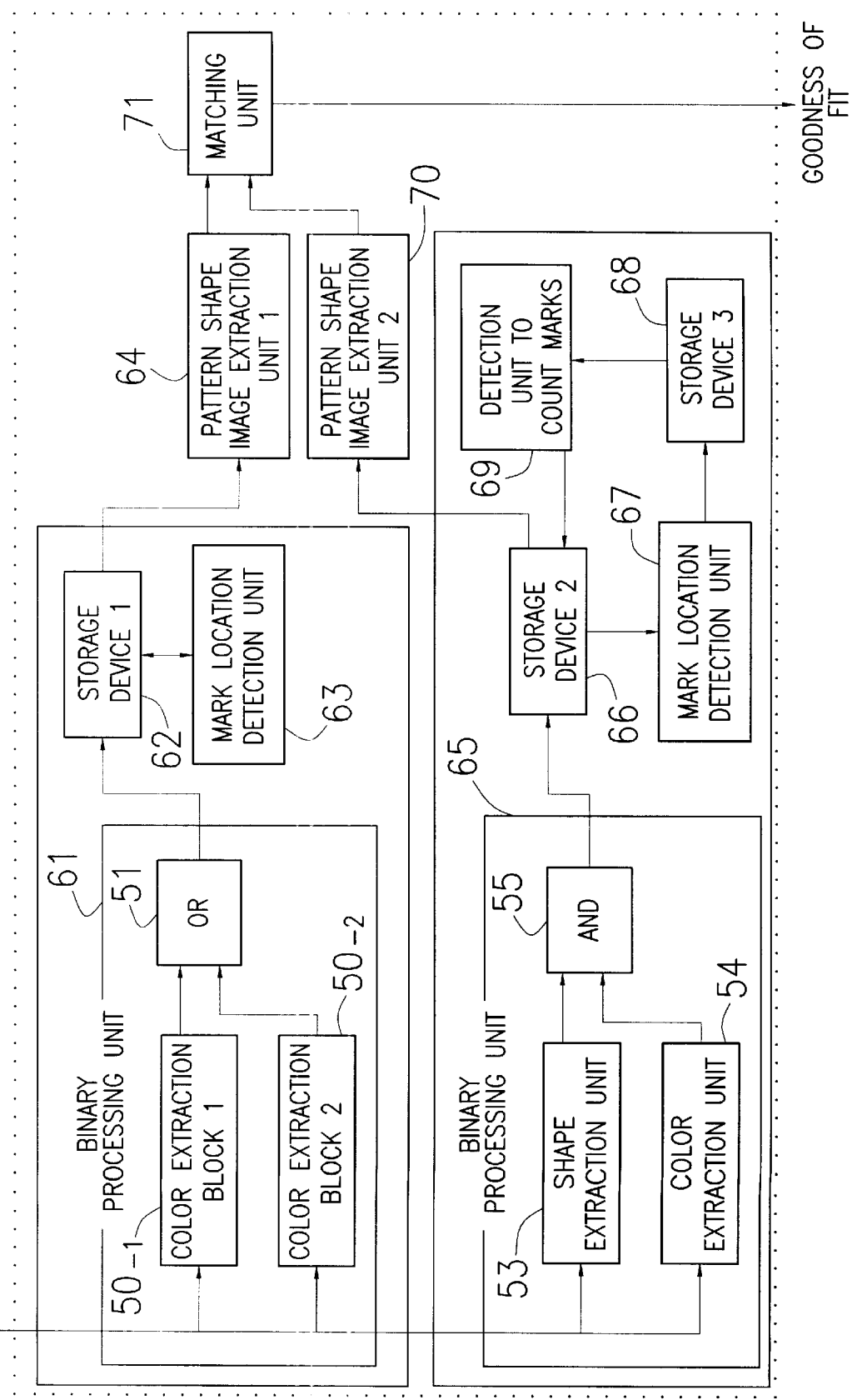
FIG. 28 is a block diagram of another image processing device which is an ideal embodiment of this invention.

FIG. 28 is a block diagram showing the configuration of another image processing device which is an ideal embodiment of this invention. This image processing device consists of binary processing unit 61; storage device 62; mark location detection unit 63; pattern shape image extraction unit 64; binary processing unit 65; storage device 66; mark location detection unit 67; storage device 68; detection unit 69 to count marks; pattern shape image extraction unit 70; and pattern matching unit 71. Binary processing units 61 and 65 are identical to processing units 41 and 45 in FIG. 23.

The portion of the device comprising binary processing unit 61, storage device 62, mark location detection unit 63 and pattern shape image extraction unit 64 is identical to the device in FIG. 1. Binary data identical to those shown in FIG. 24 are stored, and mark location detection unit 63 detects images which correspond to mark 8a in FIG. 6(a). The portion of the image around the mark is extracted by pattern image extraction unit 64. For example, the image could be divided into four areas and pattern matching unit 71 could obtain the goodness of fit by determining to what extent each area corresponded to the shape of a previously specified mark. The goodness of fit would then be output to the PPC.

Binary data identical to those pictured in FIG. 24 are stored in storage device 66. Mark location detection unit 67 uses a template to detect the marks, and stores a "1" at each address in storage unit 68 which corresponds to the coordinates of a detected mark. An example of the data which might be stored in storage unit 68 when all the marks have been detected is pictured in FIG. 25. Here a 5×4 pixel area has been compressed into a single pixel; in other words, the data have been compressed to 1/20 of their previous size.

Detection unit to count marks 69 checks the number of marks detected by unit 67 and stored in storage device 68. If the number of marks in a given pixel area is equal to a stipulated number, the coordinates (the address) stored in storage device 66 for that area are output.

In the example shown in FIG. 27, the number of marks which are on the pixels indicated in FIG. 27(b) is detected. The stipulated coincidence here is ten marks on the outer square and one on the inner square. Since the number of marks in FIG. 27(a) meets these conditions, detection unit 69 outputs the coordinates (the address) stored in storage device 66 for pixel 23a in the binary image shown in FIG. 24.

Figure 29:
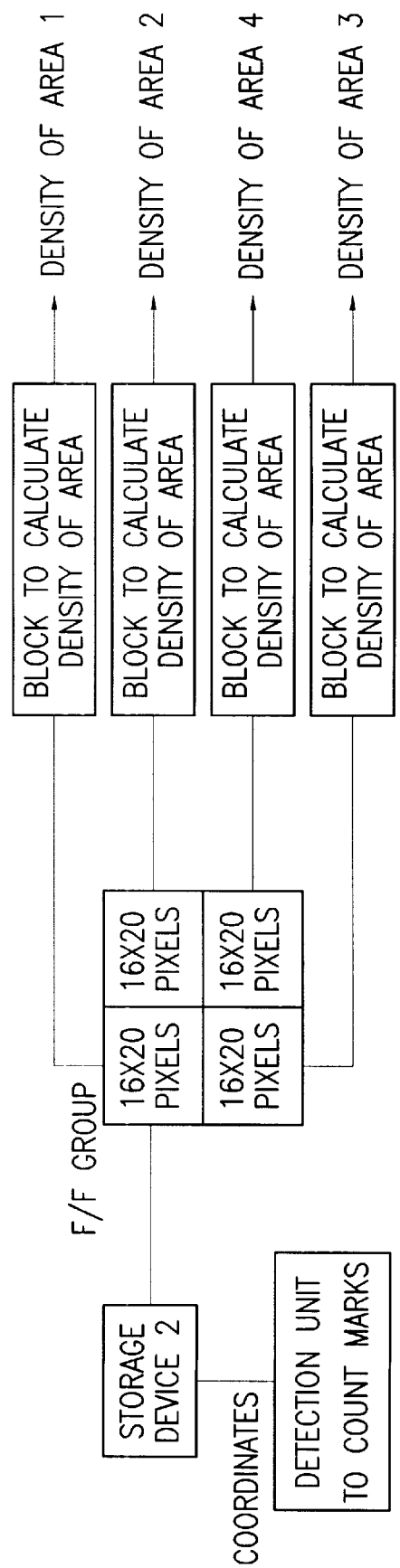
FIG. 29 is a block diagram of the second pattern shape extraction unit in the same image processing device.
Figure 30:
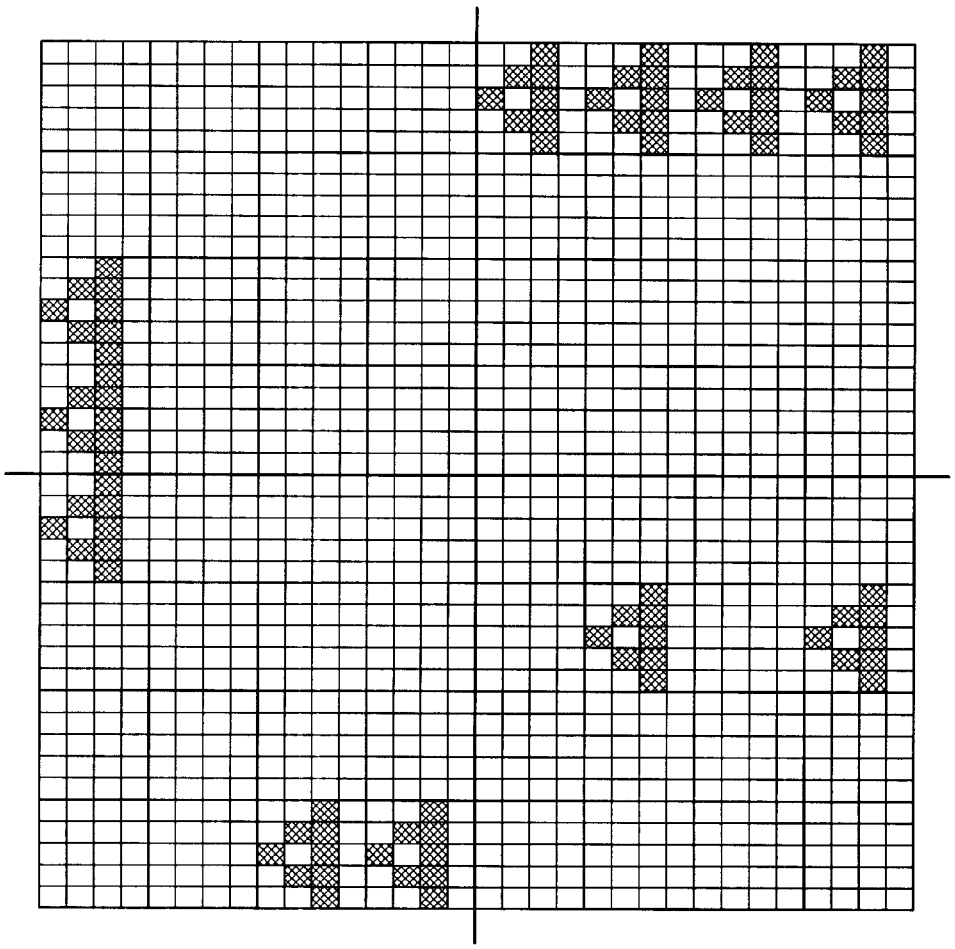
FIG. 30 illustrates the images extracted by the same pattern shape extraction unit.
Figure 31:
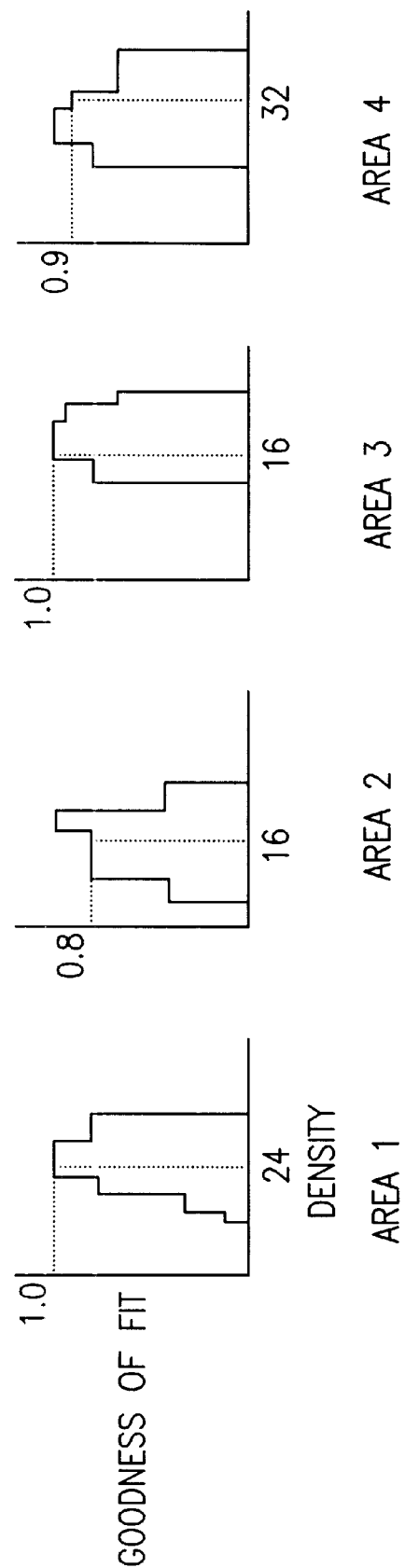
FIG. 31 gives the membership functions for the four areas used by the pattern matching unit in the image processing device pictured in FIG. 28.

When fuzzy matching is to be executed at a later stage of the processing, pattern shape image extraction unit 70 uses the coordinates output by detection unit 69 to extract the required pixel area from storage device 66. As can be seen in FIG. 29, the image is divided into four areas, so each area is a 16×20 pixel chunk represented by a flip-flop group. The density detection block for each area detects its density and outputs the results as densities 1, 2, 3 and 4. If the binary image stored in storage device 66 is the one shown in FIG. 24, the images of the four extracted areas will be those in FIG. 30. The density of each area can be obtained by counting the black pixels in that area. The density of area 1 is 24, that of areas 2 and 3 is 16, and that of area 4 is 32. Pattern matching unit 71 applies the detected densities to the membership functions shown in FIG. 31. It obtains goodnesses of fit 1.0, 0.8, 1.0 and 0.9 and from these it obtains the average goodness of fit for the four areas, 0.925, and outputs this result to the PPC. The PPC determines whether this value exceeds a value which has been stipulated.

We shall next explain the circuits used in the devices in FIGS. 23 and 28.

Figure 32:
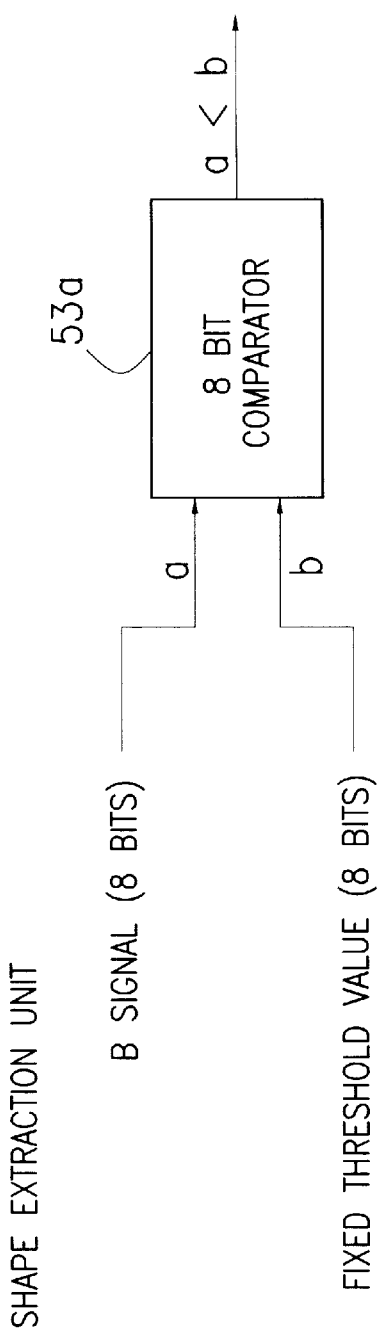
FIG. 32 illustrates the shape extraction unit in the image processing devices pictured in FIGS. 23 and 28.

Shape extraction unit 53 in the binary processing unit inputs whichever of the R, G and B signals best represents the shape. FIG. 32 shows shape extraction unit 53. The signal input into the detection unit is an 8-bit B signal which corresponds to marks printed in yellow. For magenta marks, a G signal is input, and for cyan marks, an R signal. 8-bit comparator 53a compares this signal with a previously set threshold value and binarizes the image. Here a fixed threshold value is used; however, if circumstances warrant it, a floating binary circuit could be used to change the threshold value according to the density of the document in order to obtain a more accurate shape.

Figure 34:
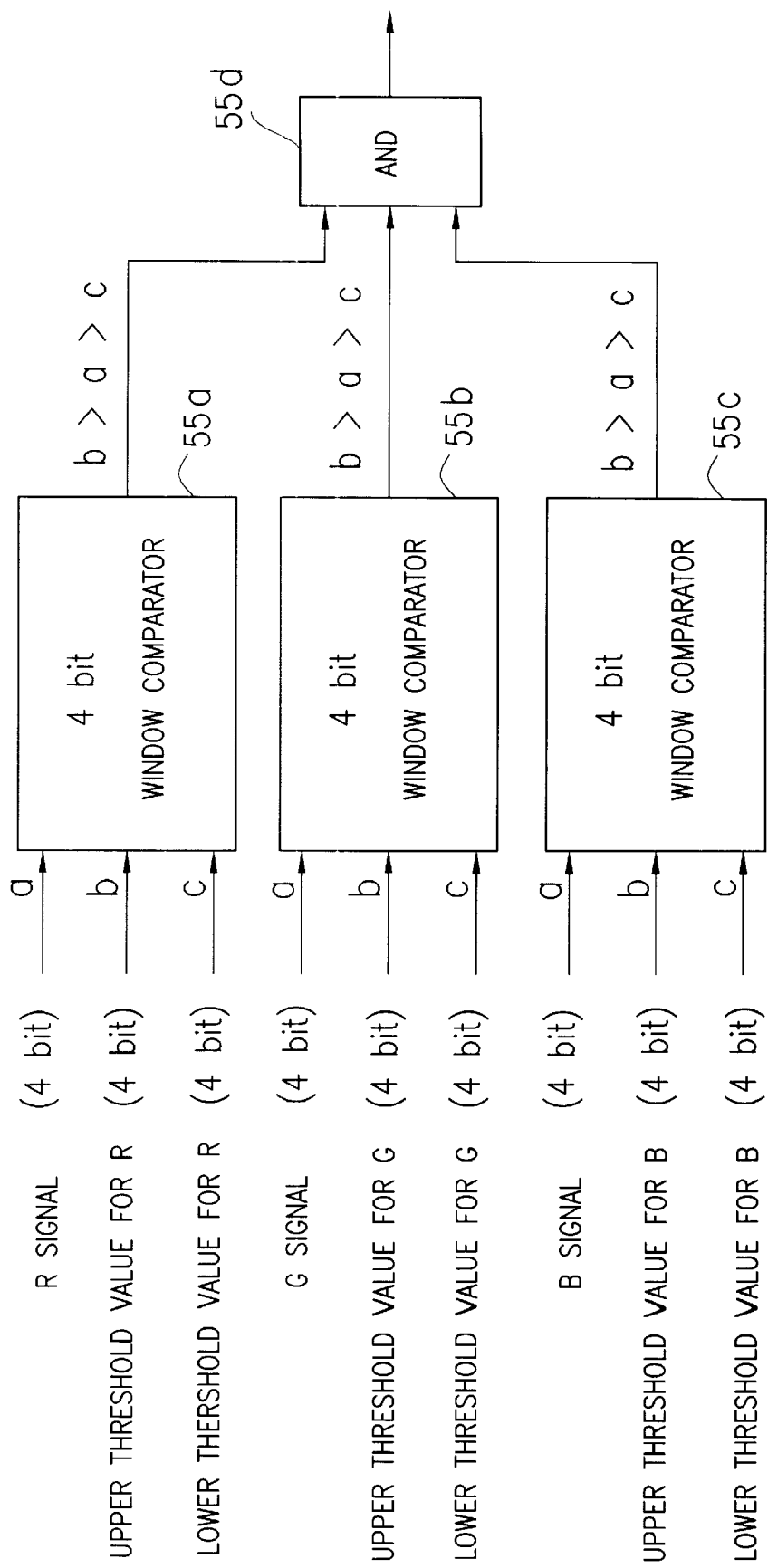
FIG. 34 is a block diagram of the color extraction unit in the same image processing device.

FIG. 34 is a detailed diagram of color extraction unit 34. 4-bit window comparators 55a, 55b and 55c consist of three systems, one each for R, G and B. When the logical product of their three outputs is input into AND circuit 55d, only the specified color is extracted. The resolution of the comparators in the color extraction unit may be determined according to the accuracy of color separation which is required. Since printed materials in general suffer from extreme non-uniformity (variation) of color, high color resolution would be pointless and would drive up the cost. Thus a lower-resolution comparator can be used for the color than for the shape.

Figure 33:
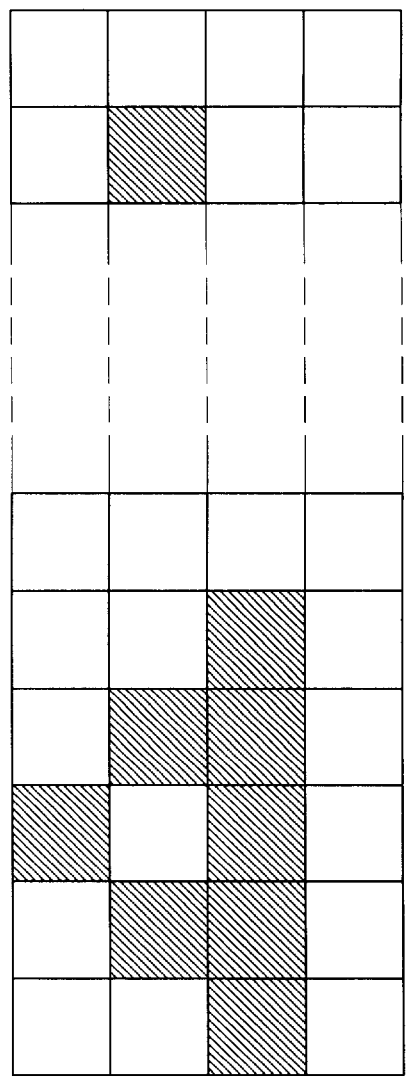
FIG. 33 shows a binary image stored in a storage device after being output by the binary processing unit in the same image processing device.
Figure 35:
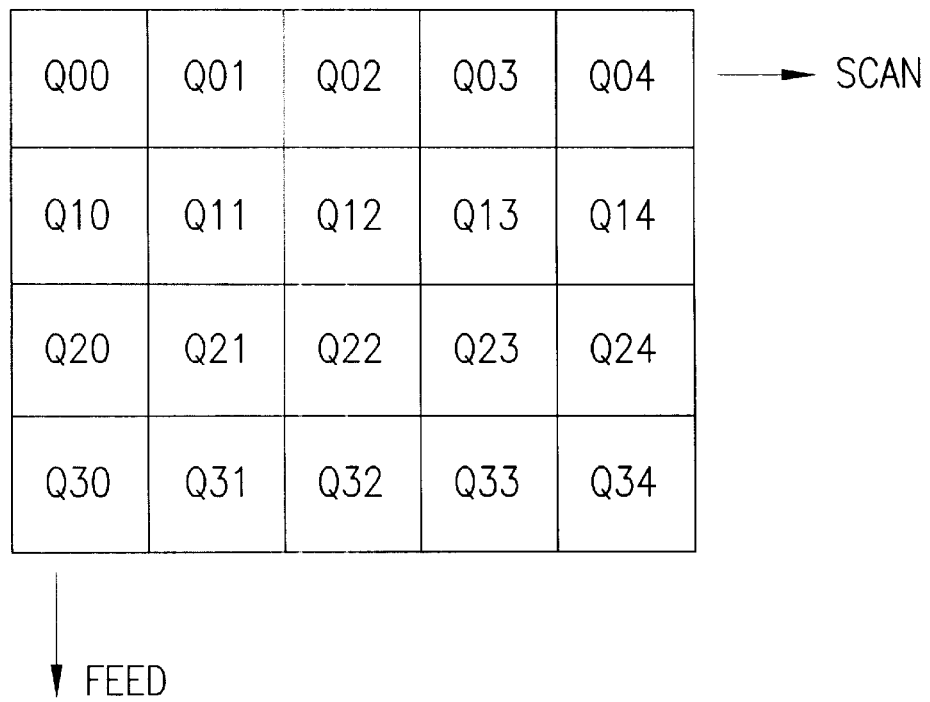
FIG. 35 is a graphic representation of the window unit which detects the marks.

FIG. 33 is the output of binary processing unit 41. The drawing shows a portion of the image stored in storage devices 42 and 46. Mark location detection unit 47 uses the image data in FIG. 33 to detect the center of each mark. FIG. 35 is a graphic representation of the window unit used to detect the marks. The fifteen flip-flops from $Q_{00}$ through $Q_{34}$ are moved pixel by pixel in the scanning and feed directions to detect the presence of marks.

Figure 36:
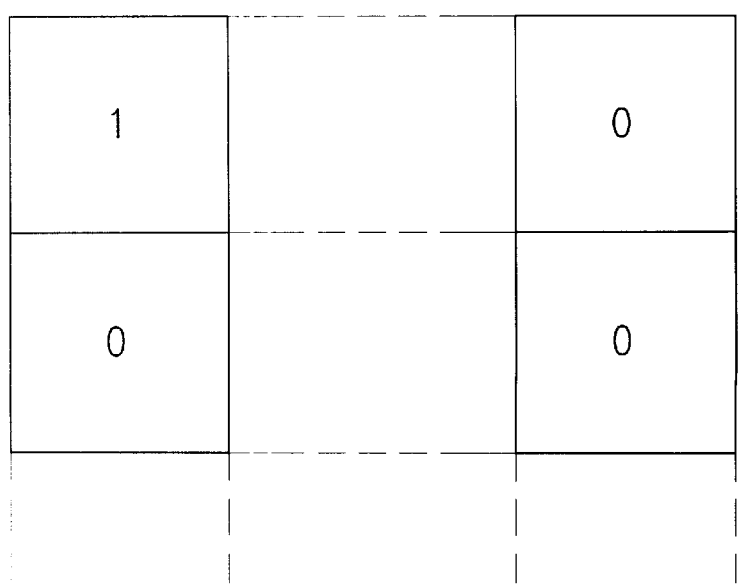
FIG. 36 shows an example of data stored in the storage device to represent detected marks.

FIG. 36 shows the results of the detection process, which are the data stored in storage device 48. A "1" indicates that a mark is found in that location and a "0" that no mark is found. The 5×4 pixel unit in FIG. 33 has become a single pixel in FIG. 36; in other words, the volume of data has been compressed to 1/20 of its previous size.

Figure 37:
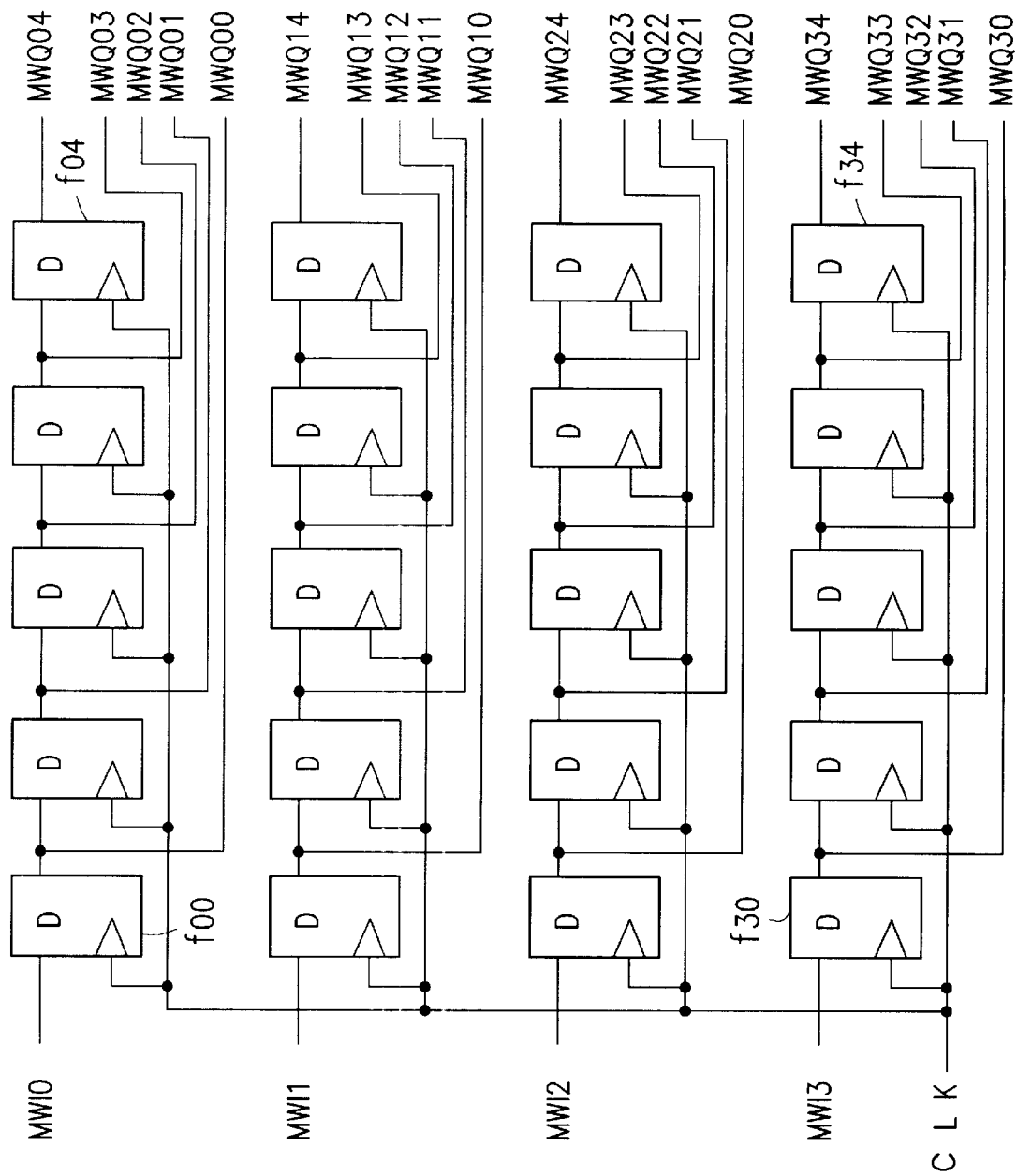
FIG. 37 is a block diagram of the window unit used to detect the marks.
Figure 38:
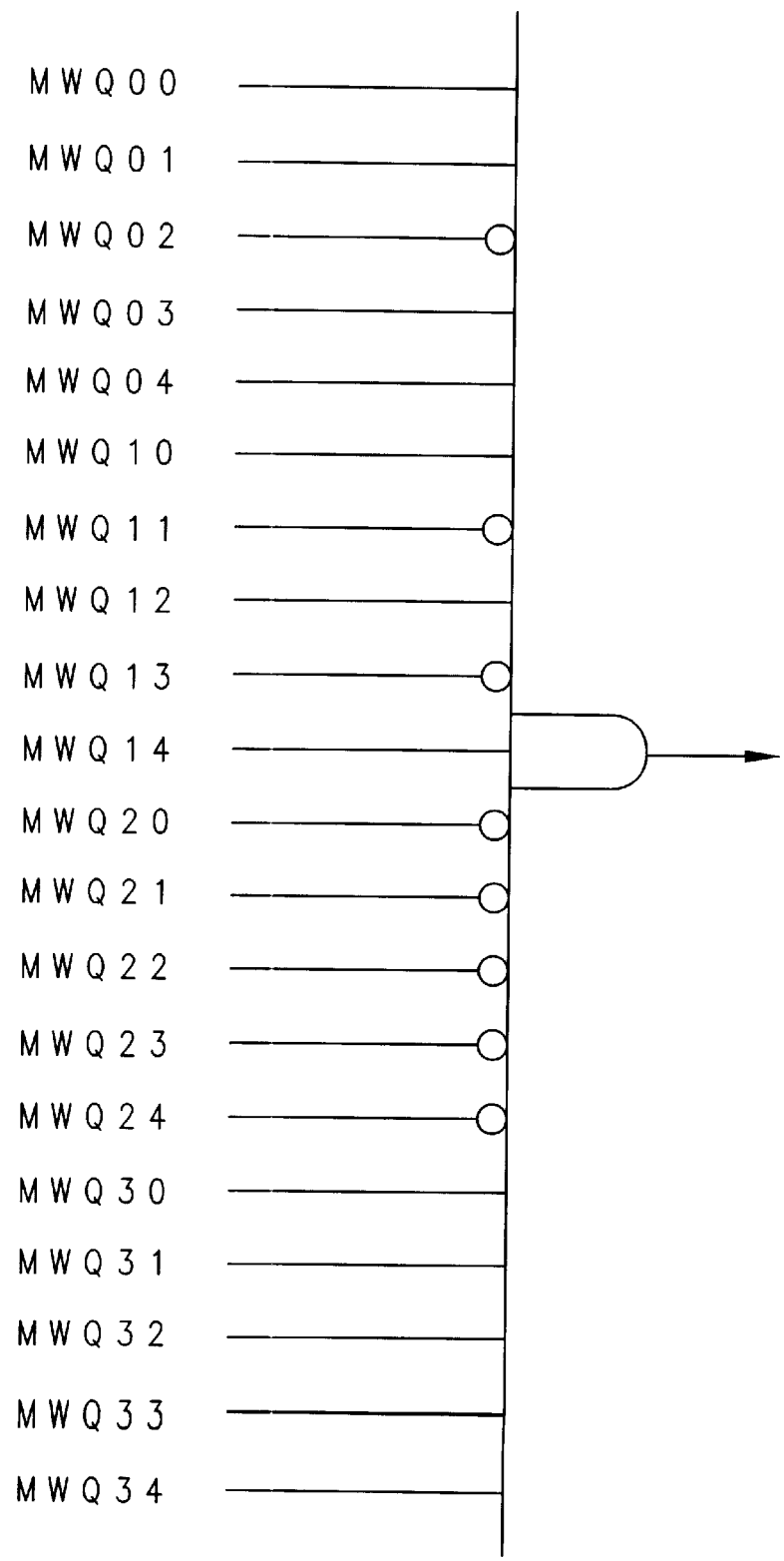
FIG. 38 shows the decoder circuit which accepts the output of each flip-flop in the window unit and outputs a signal only when particular data are found.

FIGS. 37 and 38 are detailed representations of mark location detection unit 47. FIG. 36 is the window unit used to detect the marks. Flip-flops $f_{00}$ through $f_{34}$ are arranged in a 5×4 matrix. The image data are moved to the next horizontal flip-flop according to a shift clock. The outputs $MWQ_{00}$ through $MWQ_{34}$ of flip-flops $f_{00}$ through $f_{34}$ are input into the decoder circuit shown in FIG. 38. When the black pixels (i.e., pixels with logic "1") are lined up in a given shape, the HIT output of the decoder circuit goes to "1" to indicate that a mark has been found.

Figure 39:
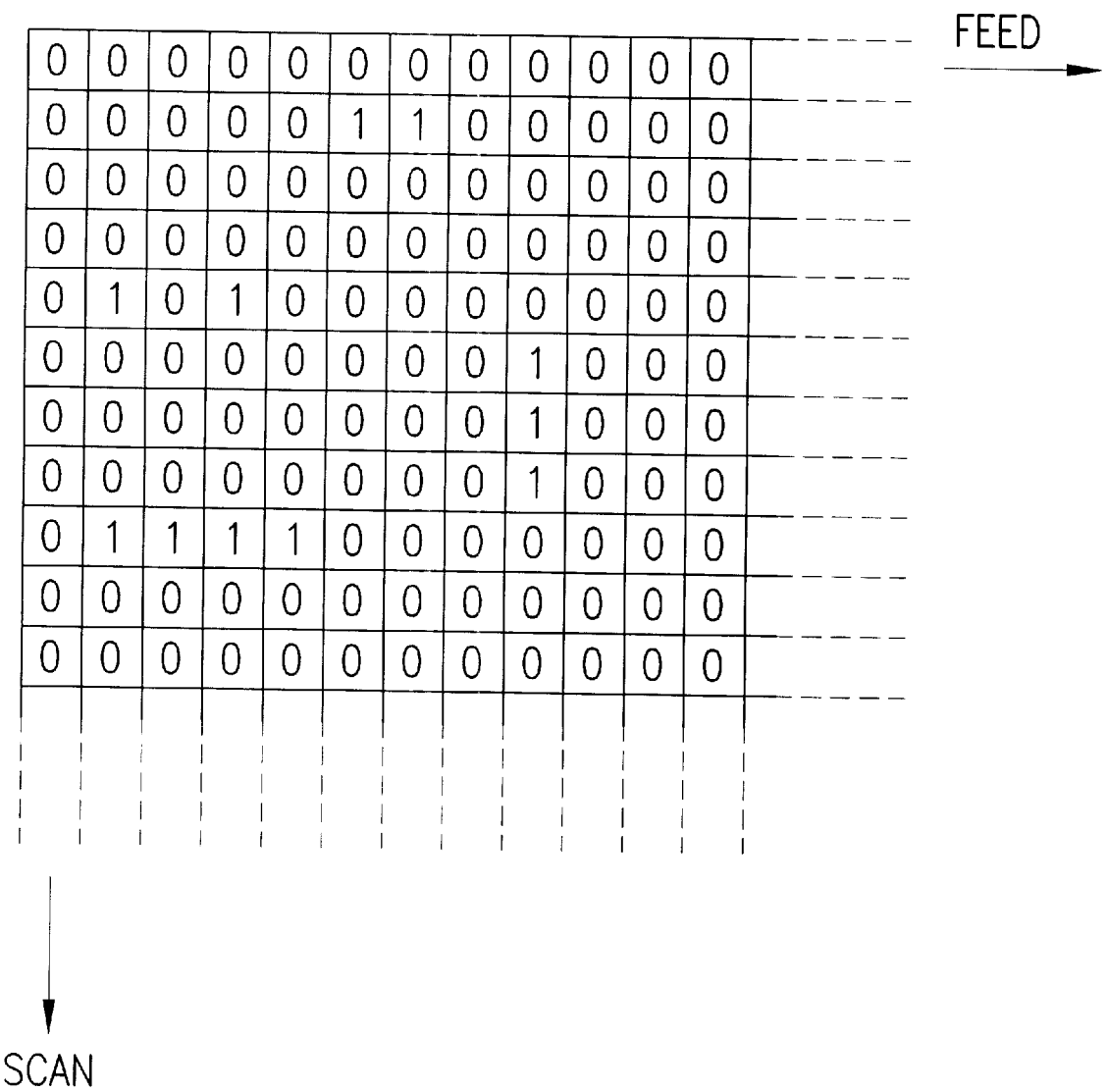
FIG. 39 is a diagram of the data indicating the locations of marks which are stored in the storage device.

FIG. 39 is a graphic representation of the internal data in storage device 48. Locations with a mark are expressed as "1", those without a mark as "0".

Figure 40:
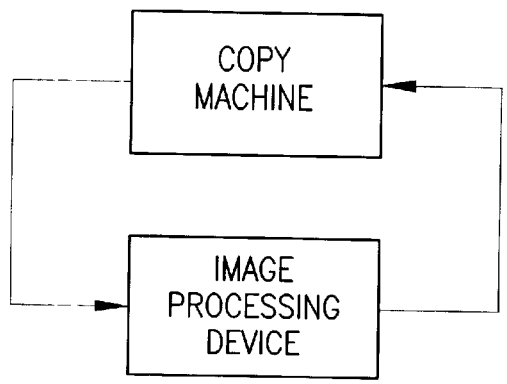
FIG. 40 illustrates how the various image processing devices described above as ideal embodiments of this invention may be applied in a copy machine.
Figure 41:
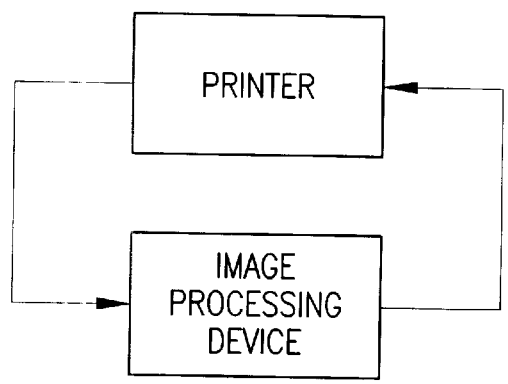
FIG. 41 illustrates how the various image processing devices described above as ideal embodiments of this invention may be applied in a printer.
Figure 42:
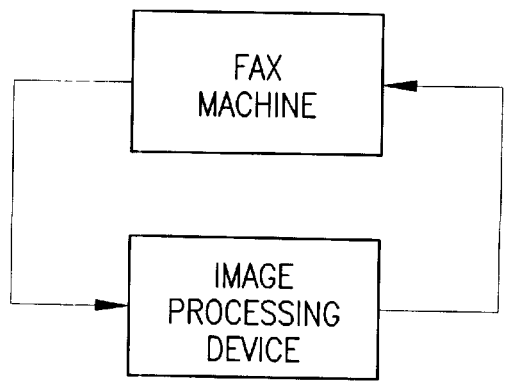
FIG. 42 illustrates how the various image processing devices described above as ideal embodiments of this invention may be applied in a fax machine.

Each embodiment of the image processing device discussed above can be applied in a copy machine, printer or fax machine, as may be surmised from FIGS. 40, 41 and 42. The original document to be copied, printed or faxed is received from the parent device and subjected to image processing. If it has a specified mark on it, this information is conveyed to the parent device, which can then take appropriate measures to prevent it from being copied, printed or faxed.

One embodiment of the present invention performs one-color extraction on a number of colors and uses the results of these extractions to make a determination. This method enhances the accuracy of the determination when the specified image (the arrangement of marks) contains various colors.

Another embodiment of the present invention consolidates the results of extracting a number of colors into a single result. This allows the configuration of the determination unit to be simplified. Another embodiment counts the pixels of a given color which are extracted and uses this value for the determination. This allows it to make a determination using an approximate numerical value without executing a detailed comparison of two images. Still another embodiment divides the image data into a number of areas and bases a comprehensive determination on a determination for each area. This enhances the accuracy of the determination.

Other embodiments of the present invention allow the user to select a configuration which will enhance the accuracy of the device and which is applicable to a variety of marks. At least two algorithms for a determination can be used if desired. If one of the algorithms will not function because the image has been tampered with, a correct determination can be made with another algorithm.

What is claimed is:

1. An image processing device to detect a particular pattern having a plurality of particular marks formed with given colors in a received color image data, comprising:
- a binary processing unit containing a plurality of mark color extracting units to extract a plurality of single-color patterns from said received color image data according to predetermined thresholds and output a plurality of binary single-color patterns, said binary processing unit further comprising an OR circuit to calculate a logical sum of said plurality of binary single-color patterns respectively output from said plurality of mark color extracting units in order to create and output a single combined binary pattern comprising said plurality of extracted single-color patterns;
- a mark location detecting unit to detect a location of said particular marks in said single combined binary pattern by using a template;
- a pattern shape extraction unit to extract said particular marks in said single combined binary pattern detected by said mark location detecting unit; and
- a pattern matching unit to compare said extracted particular marks against a plurality of reference marks in order to calculate a goodness of fit of said received color image data against said reference pattern.

2. An image processing device according to claim 1, wherein said pattern matching unit comprises
- an image matching circuit to compare said extracted particular mark against an individual reference mark; and
- a reference marks switching circuit to switch to said individual reference mark out of said plurality of reference marks stored in a memory unit successively, and send said switched individual reference mark to said image matching circuit for comparing with said extracted particular mark.

3. An image processing device according to claim 1, wherein said pattern shape extraction unit divides said extracted particular mark into a number of areas for counting a number of pixels in each area, obtains a density of said areas, and sends each density to said pattern matching unit.

4. An image processing device according to claim 3, wherein said pattern matching unit compares each density of said areas against a corresponding reference density of said reference mark by counting a number of pixels in said areas and said reference mark, said pattern matching unit outputting a goodness of fit of said extracted particular mark against said reference mark.

5. An image processing device according to claim 1, wherein said received color image data is received pixel data set by pixel data set sequentially and wherein said received color image data consists of a plurality of pixel data sets, each pixel data set consists of a plurality of different color component signals, each pixel data set represents a single color pixel of said color image.

6. An image processing device according to claim 1, wherein said received color image data is received pixel data set by pixel data set sequentially and wherein said received color image data consists of a plurality of pixel data sets, each pixel data set consists of a plurality of different color component signals, each pixel data set represents an entirety of a single color component of said color image.

7. An image processing device to detect a particular pattern having a plurality of particular marks formed with given colors in a received color image data, comprising:
- a binary processing unit containing a plurality of mark color extracting units to extract a plurality of single-color patterns from said received color image data according to predetermined thresholds and output a plurality of binary single-color patterns, said binary processing unit further comprising an OR circuit to calculate a logical sum of said plurality of binary single-color patterns respectively output from said plurality of mark color extracting units in order to create and output a single combined binary pattern comprised of said plurality of extracted single-color patterns;
- a density detection unit to convert said single combined binary pattern into a density distribution pattern in which said single combined binary pattern is divided into a plurality of sub-areas defined by a predetermined number of pixels, if a number of pixels in each sub-area exceeds a predetermined number of pixels, said sub-area is converted into a single pixel in a scaled down pattern; and
- an arrangement matching unit to match said scaled down pattern against a reference pattern by counting a number of pixels on said scaled down pattern that overlap with said reference pattern, said number of pixels being used to calculate a goodness of fit of said received color image data against said reference pattern.

8. An image processing device to detect a particular pattern of given colors in a received color image data, said received color image data being formed by a plurality of particular small color marks which are arranged in a plurality of locations on said received color image data;
- a first binary processing unit containing a plurality of mark color extracting units to extract a plurality of single-color patterns from said received color image data according to predetermined thresholds and output a plurality of binary single-color patterns, said first binary processing unit further comprising an OR circuit to calculate a logical sum of said plurality of binary single-color patterns respectively output from said plurality of mark color extracting units in order to output a single combined binary pattern comprised of said plurality of extracted single-color patterns;
- a density detection unit to convert said single combined binary pattern into a density distribution pattern in which said single combined binary pattern is divided into a plurality of sub-areas defined by a predetermined number of pixels, if a number of pixels in each sub-area exceeds a predetermined number of pixels, said sub-area is converted into a single pixel in a first scaled down pattern;
- a pattern matching unit to match said first scaled down pattern against a reference pattern by counting a number of pixels on said first scaled down pattern which overlap with said reference pattern, said number of pixels being used to calculate a first goodness of fit of said received color image data against said reference pattern;
- a second binary processing unit which outputs a distribution image of a plurality of small color marks in said received color image data; comprising:
  - a shape extracting unit to extract said plurality of small color marks and output a mark distribution image of said small marks;
  - a color extracting unit to extract a color image and output a color image of said received color image; and
  - an AND circuit to calculate a logical product of said mark distribution image from said shape extracting unit and said color image from said color extracting unit; and a small mark location detection unit to identify each location of said small marks and convert each small mark into a single dot to output a second scaled down received image, thereby said arrangement matching unit can further count a number of pixels on said second scaled down received image which overlap with a reference pattern, said second number of pixels being used for calculate a second goodness of fit in said pattern matching unit in order to detect said particular marks.

9. A copy machine, comprising:

an image processing device to detect a particular pattern having a plurality of particular marks formed with given colors in a received color image data, said image processing device comprising:
- a binary processing unit containing a plurality of mark color extracting units to extract a plurality of single-color patterns from said received color image data according to predetermined thresholds and output a plurality of binary single-color patterns, said binary processing unit further comprising an OR circuit to calculate a logical sum of said plurality of binary single-color patterns respectively output from said plurality of mark color extracting units in order to create and output a single combined binary pattern comprising said plurality of extracted single-color patterns;
- a mark location detecting unit to detect a location of said particular marks in said single combined binary pattern by using a template;
- a pattern shape extraction unit to extract said particular marks in said single combined binary pattern detected by said mark location detecting unit; and
- a pattern matching unit to compare said extracted particular marks against a plurality of reference marks in order to calculate a goodness of fit of said received color image data against said reference pattern.

10. A printer comprising:

an image processing device to detect a particular pattern having a plurality of particular marks formed with given colors in a received color image data, said image processing device comprising:
- a binary processing unit containing a plurality of mark color extracting units to extract a plurality of single-color patterns from said received color image data according to predetermined thresholds and output a plurality of binary single-color patterns, said binary processing unit further comprising an OR circuit to calculate a logical sum of said plurality of binary single-color patterns respectively output from said plurality of mark color extracting units in order to create and output a single combined binary pattern comprising said plurality of extracted single-color patterns;
- a mark location detecting unit to detect a location of said particular marks in said single combined binary pattern by using a template;
- a pattern shape extraction unit to extract said particular marks in said single combined binary pattern detected by said mark location detecting unit; and
- a pattern matching unit to compare said extracted particular marks against a plurality of reference marks in order to calculate a goodness of fit of said received color image data against said reference pattern.

11. A fax machine comprising:

an image processing device to detect a particular pattern having a plurality of particular marks formed with given colors in a received color image data, said image processing device comprising:
- a binary processing unit containing a plurality of mark color extracting units to extract a plurality of single-color patterns from said received color image data according to predetermined thresholds and output a plurality of binary single-color patterns, said binary processing unit further comprising an OR circuit to calculate a logical sum of said plurality of binary single-color patterns respectively output from said plurality of mark color extracting units in order to create and output a single combined binary pattern comprising said plurality of extracted single-color patterns;
- a mark location detecting unit to detect a location of said particular marks in said single combined binary pattern by using a template;
- a pattern shape extraction unit to extract said particular marks in said single combined binary pattern detected by said mark location detecting unit; and
- a pattern matching unit to compare said extracted particular marks against a plurality of reference marks in order to calculate a goodness of fit of said received color image data against said reference pattern.

12. A method of detecting a particular pattern having a plurality of particular marks formed with given colors in a received color image data, said method comprises:
- extracting a plurality of single-color patterns from said received color image data according to predetermined thresholds;
- calculating a logical sum of said extracted plurality of binary single-color patterns to create and output a single combined binary pattern out of said plurality of extracted single-color patterns;
- detecting a location of said particular marks in said single combined binary pattern by using a template;
- extracting said particular marks in said single combined binary pattern detected by said mark location detecting unit;
- comparing said extracted particular marks against a plurality of reference marks in order to calculate a goodness of fit of said received color image data against said reference pattern; and
- using said goodness of fit to determine if said particular pattern is within said received color image data.

\* \* \* \* \*